United States Patent
Perugupalli et al.

(10) Patent No.: US 11,978,185 B1
(45) Date of Patent: May 7, 2024

(54) SYSTEM AND METHODS FOR COLOR GAMUT NORMALIZATION FOR PATHOLOGY SLIDES

(71) Applicant: Pramana, Inc., Cambridge, MA (US)

(72) Inventors: Prasanth Perugupalli, Cary, NC (US); Raghubansh Bahadur Gupta, Bangalore (IN); Prateek Jain, Karnataka (IN); Durgaprasad Dodle, Telangana (IN); Shilpa G. Krishna, Kerala (IN)

(73) Assignee: Pramana, Inc., Cambridge, MA (US)

( * ) Notice: Subject to any disclaimer, the term of this patent is extended or adjusted under 35 U.S.C. 154(b) by 0 days.

(21) Appl. No.: 18/513,079

(22) Filed: Nov. 17, 2023

Related U.S. Application Data

(60) Provisional application No. 63/427,366, filed on Nov. 22, 2022.

(51) Int. Cl.
  *G06T 5/00* (2024.01)
  *G06T 3/40* (2006.01)
  (Continued)

(52) U.S. Cl.
  CPC ............... *G06T 5/92* (2024.01); *G06T 3/40* (2013.01); *G06T 7/11* (2017.01); *G06T 11/001* (2013.01);
  (Continued)

(58) Field of Classification Search
  CPC ............ G06T 7/0012; G06T 7/11; G06T 2207/10056; G06T 2207/20084;
  (Continued)

(56) References Cited

U.S. PATENT DOCUMENTS

| | | |
|---|---|---|
| 2020/0388029 A1* | 12/2020 | Saltz ................... G06V 10/267 |
| 2021/0056287 A1* | 2/2021 | Schaumburg ........ G06V 10/462 |

(Continued)

FOREIGN PATENT DOCUMENTS

| | | |
|---|---|---|
| WO | 2021188446 A1 | 9/2021 |
| WO | 2022246294 A1 | 11/2022 |
| WO | 2023059920 A1 | 4/2023 |

OTHER PUBLICATIONS

Li, Xintong, et al. "A comprehensive review of computer-aided whole-slide image analysis: from datasets to feature extraction, segmentation, classification and detection approaches." Artificial Intelligence Review 55.6 (2022): 4809-4878. (Year: 2022).*

(Continued)

*Primary Examiner* — Li Liu
(74) *Attorney, Agent, or Firm* — Caldwell Intellectual Property Law

(57) ABSTRACT

A system for color gamut normalization for pathology slide is disclosed. The system includes at least a computing device, wherein the computing device is configured to generate a plurality of segmentations of a whole slide image, wherein the whole slide image includes a plurality of biological tissue type variabilities. The computing device is configured to apply a segment-specific transformation to an individual segment in a first region. The computing device is configured to apply the segment-specific transformation to an individual segment in a second region. The computing device is configured to retrieve a plurality of discrete magnification levels from a user. The computing device is configured to choose as a first magnification level from the plurality of discrete magnification levels, and the computing device is configured to store the plurality of segmentations in a cache.

20 Claims, 15 Drawing Sheets

(51) Int. Cl.
  *G06T 5/92* (2024.01)
  *G06T 7/11* (2017.01)
  *G06T 11/00* (2006.01)
(52) U.S. Cl.
  CPC .............. *G06T 2207/10024* (2013.01); *G06T 2207/10056* (2013.01); *G06T 2207/30024* (2013.01)
(58) Field of Classification Search
  CPC .......... G06T 2207/20021; G06V 10/82; G06V 20/695; G06V 10/25; G06V 20/70; G06V 2201/03; G06V 20/69
  See application file for complete search history.

(56) References Cited

U.S. PATENT DOCUMENTS

| | | | | |
|---|---|---|---|---|
| 2021/0133966 A1* | 5/2021 | Fuchs | ................... | G06V 10/25 |
| 2022/0351379 A1* | 11/2022 | Lorsakul | ............... | G06T 7/0012 |
| 2022/0366619 A1* | 11/2022 | Alemi | ....................... | G06T 7/90 |
| 2023/0177682 A1* | 6/2023 | Xiao | ......................... | G06T 7/11 |
| | | | | 382/133 |
| 2023/0274534 A1 | 8/2023 | Alchert et al. | | |
| 2023/0282011 A1* | 9/2023 | Teichmann | ............ | G06V 10/26 |
| | | | | 382/128 |
| 2023/0306606 A1 | 9/2023 | Aichert et al. | | |

OTHER PUBLICATIONS

DICOM Whole Slide Imaging (WSI); Last updated: Thu Apr. 7, 2002 15:17:59 EDT.

Xianxu et al; Dual Adaptive Pyramid Network for Cross-Stain Histopathology Image Segmentation; International Conference on Medical Image Computing and Computer-Assisted Intervention MICCAI 2019: Medical Image Computing and Computer Assisted Intervention—MICCAI 2019 pp. 101-109; Sep. 2019.

* cited by examiner

SYSTEM AND METHODS FOR COLOR GAMUT NORMALIZATION FOR PATHOLOGY SLIDES

CROSS-REFERENCE TO RELATED APPLICATIONS

This application claims the benefit of priority of U.S. Provisional Patent Application Ser. No. 63/427,366, filed on Nov. 22, 2022, and titled "SYSTEM AND METHOD FOR COLOR GAMUT NORMALIZATION FOR PATHOLOGY SLIDES," which is incorporated by reference herein in its entirety.

FIELD OF THE INVENTION

The present invention generally relates to the field of histological analysis. In particular, the present invention is directed to a system and method for color gamut normalization for pathology slides.

BACKGROUND

Histological analysis of tissue specimens is used to evaluate the pathology of various kinds of diseases. Examination of histological slides using a microscope is a classically used method to study these disorders. However, this time-consuming and limited practice has been gradually replaced by emerging technologies such as whole slide imaging (WSI). WSI is the scanning of slides in order to produce digital slides. With such advantages as easy image accessibility, storage, wide field of view and high resolution, WSI is widely used by pathology and educational departments worldwide. However, WSI poses challenges both during the digitization of slides as well as during the visual examination of the digitized slides. Accordingly, there is a desire for improved techniques for digitization and examination of digitized slides.

SUMMARY OF THE DISCLOSURE

In an aspect, a system for color gamut normalization for pathology slide is disclosed. The system includes at least a computing device, wherein the computing device is configured to receive a magnification level. The computing device is configured to apply a segment-specific transformation to an individual segment in a first region. The computing device is configured to generate a plurality of segmentations of a whole slide image as a function of one or more biological tissue type variabilities and the magnification level. The computing device is configured to apply a segment-specific transformation to each segment of the plurality of segments in a first region.

In another aspect, a method for color gamut normalization for pathology sides is disclosed. This method involves receiving, using at least a computing device, a magnification level. This method involves generating, using at least a computing device, a plurality of segmentations of a whole slide image, wherein the whole slide image further includes a plurality of biological tissue type variabilities. This method involves applying, using the at least a computing device, a segment-specific transformation to each segment of the plurality of segment in a first region.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for automated color gamut normalization and segmentation specific image processing pathology slides. In an embodiment, a computing device within the system executes machine learning algorithms to analyze whole slide images, applying segment-specific transformations to improve the perceptual quality of each segment based on its unique visual characteristics.

Aspects of the present disclosure can be used to enhance the clarity and detail of digital pathology images, enabling pathologists to more accurately diagnose and understand various tissue abnormalities. Aspects of the present disclosure can also be used to streamline the process of preparing slides for review, reducing the manual effort required to adjust image parameters for optimal visibility. This is so, at least in part, because systems and methods leverage advanced computer vision techniques and machine learning models to intelligently and dynamically adjust images according to predefined criteria that correlate with diagnostically relevant features.

Figure 1:
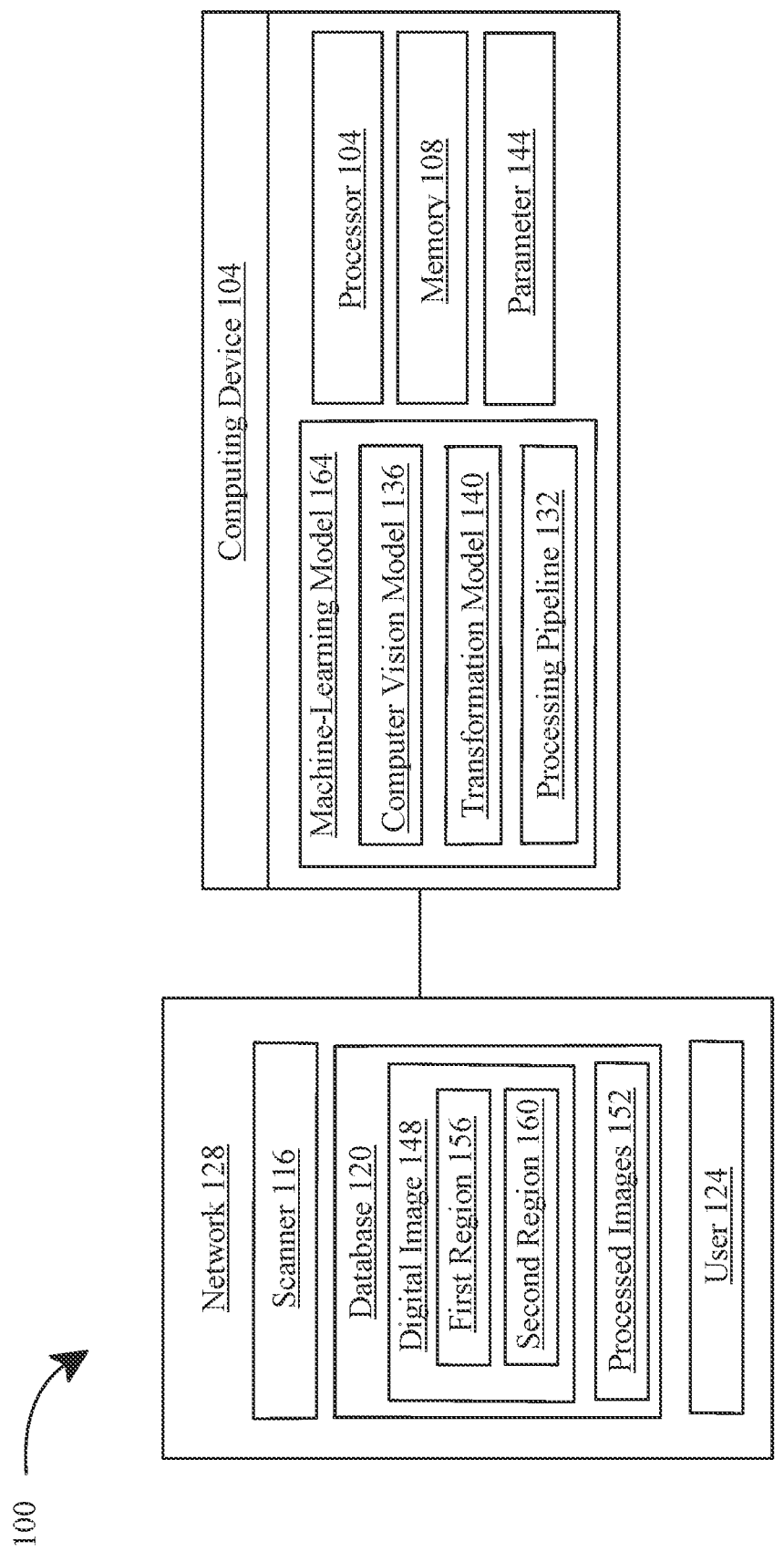
FIG. 1 is a block diagram of an exemplary system for color gamut normalization for pathology slides.

Referring now to FIG. 1, an exemplary embodiment of a system 100 for color gamut normalization for pathology slides is illustrated. System includes a computing device. Computing device includes a processor communicatively connected to a memory. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Further referring to FIG. 1, Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented, as a non-limiting example, using a "shared nothing" architecture.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1 a simplified system 100 for autonomous color gamut normalization for digital slides is illustrated, in accordance with certain embodiments of the present disclosure. System 100 includes one or more scanners 116, a database 120, a plurality of users 124, and a plurality of devices that are communicatively coupled via a network 128. Network 128 may include one or more local area networks (LANs), wide area networks (WANs), wired networks, wireless networks, the Internet, or the like. Illustratively, scanners 116 may communicate over network 128 using the TCP/IP protocol or other suitable networking protocols.

Still referring to FIG. 1, Scanners 116 may scan slides into a digital image 148. In some embodiments, the slides may be conventional glass slides and digital image 148 may be whole slide images (WSI). Database 120 may store digital image 148 via network 128. Database 120 may be configured as a structured database with contents organized according to a schema or other logical relationships. For example, database 120 may be a relational database.

Although database 120 is depicted as being directly coupled to the network 128, it is to be understood that a variety of other arrangements are possible. For example, database 120 may be directly coupled to one or more of device, or the like.

Still referring to FIG. 1, for efficient storage and/or transmission via network 128, digital image 148 stored in database 120 may be compressed prior to or during transmission via network 128. Security measures such as encryption, authentication (including multi-factor authentication), SSL, HTTPS, and other security techniques may also be applied.

Still referring to FIG. 1, computing devices 104 may include computer devices or systems, such as personal computers, mobile devices, servers, or the like. One or more of devices can access digital image 148 via network 128. In some embodiments, computing device 104 may access one or more of digital image by downloading digital image 148 from the network 128. In some embodiments, database 120 may be directly coupled to one or more of computing device 104, and computing device 104 may directly access one or more of digital image 148 by downloading digital 20 images from the database 120.

Still referring to FIG. 1, computing device 104 includes a processor 108 (e.g., one or more hardware processors) coupled to a memory 108 (e.g., one or more non-transitory memories). Memory 160 stores instructions and/or data corresponding to a processing pipeline 132, a computer vision model 136 (or multiple machine learning models), and a transformation model 140. When executed by processor 108, processing pipeline 132 generates a plurality of processed images 152 based on one or more digital image 148 by executing the processing pipeline 132. In some embodiments, one or more devices may upload the processed images 152 to the database 120.

Still referring to FIG. 1, during execution of processing pipeline 132, processor 108 executes a transformation model 140 to transform the input data according to a specified requirement. In some embodiments, processor 108 further receives an input from a user 124, and the input may include the choice of a specific transformation model from a plurality of transformation models, a customized transformation model, etc. In some embodiments, processor 108 receives the input feature data for a customized transformation model 140 from user 124.

With continued reference to FIG. 1, system 100 may be designed and/or configured to perform any method, method step, or sequence of method steps in any embodiment described in this disclosure, in any order and with any degree of repetition. For instance, system may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. System 100 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, processor 108 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

Still referring to FIG. 1, users 124 may include LCD, CRT monitors, or the like. In some embodiments, users 124 may further include a user interface or a web browser through which a user can interact with an implementation of the subject matter described herein. For example, user 124 may input feature data, preference, configuration, or any settings into system 100. Although plurality of users 124 may be depicted as being directly coupled to the network 128, it is to be understood that a variety of other arrangements may be possible. For example, plurality of users may be directly coupled to computing device 104, or the like. Plurality of users may access digital content from the database 120 via network 128, or directly from computing device 104. In some embodiments, one or more of users may access and view one or more of digital image at different magnification levels. In some embodiments, one or more of users may access and view one or more of processed images 152 generated by computing device 104 at different magnification levels. In some embodiments, plurality of users may view different biological organizations at different magnification levels. Some or all of the magnification levels may be associated with semantic meanings. Illustrative embodiments of the example magnification levels and the corresponding semantic meanings of a user are described below with reference to FIG. 2. Although various components of system 100, such as scanners 116, users 124, and computing device 104, are illustratively depicted as communicating via network 128, it is to be understood that other arrangements are possible. In some embodiments, a plurality of components of system 100 may be part of an integrated platform or workstation, such that communication between the components may occur via local connections. In some embodiments, the plurality of components of system 100 may be located within a shared enclosure and/or may share computing resources, such as processor 108.

Still referring to FIG. 1, system 100 comprising at least a computing device 104, wherein the computing device 104 is configured to generate a plurality of segmentations of a whole slide image, wherein the whole slide image includes a plurality of biological tissue type variabilities. As used in this disclosure, "segmentation" refers to the process of dividing the image into different parts or regions based on certain criteria. System 100 may generate a "plurality of segmentation", which means it can produce multiple such divisions or categorizations of the WSI. Each segmentation may be based on different criteria, algorithms, or parameters. For example, one segmentation may differentiate tissue types while another might be based on cellular structures or staining patterns. As used in this disclosure, "biological tissue type variabilities" refers to variation or difference in the types of biological tissue. Biological tissues may vary widely, from epithelial to connective to muscular tissues. In an embodiment, plurality of biological tissue type variabilities includes at least one of tissue content, tissue morphology, and tissue thickness. A plurality of biological tissue type variabilities suggests that the WSI contains multiple different types of tissue, and there are variation within those tissue types. As used in this disclosure, "slides" refers to a thin flat piece of glass or other transparent material on which a biological sample, such as tissue section or smear, is plated for examination under a microscope. Slides include, but are not limited to histology slides, blood smear slides, cytology slides, bacterial smear slides, frozen section slides, etc. As a non-limiting example, a histology slide containing a biopsy sample from a patient's liver may be placed onto scanner. Scanner may capture a high-resolution digital image of the slide, image may be transferred through the network, the computing device 104, may initiate the segmentation process. Computer vision model may be used to divide the slide image into multiple segmentations, described further below. One segmentation may delineate areas based on cell density, another may highlight regions based on staining intensity, while yet another isolates potential tumor cells from surrounding tissues.

With continued reference to FIG. 1, in another embodiment, the whole slide image is segmented by using a computer vision model 136. A used in this disclosure, a "computer vision model" refers to a supervised vision model, self-supervised vision model, or any other suitable models those skilled in the art will appreciate. The computer vision model is trained to make predictions based on input data. Computer vision model includes a configuration, which defines a plurality of layers of computer vision model and the relationships among the layers (e.g., input layers, output layers, convolutional layers, densely connected layers, merge layers, and the like). In some embodiments, computer vision model may be configured a deep neural network with at least one hidden layer between the input and output layers. Connections between layers can include feed-forward connections or recurrent connections. One or more layers of computer vision model may be associated with a trained model parameters 144. As used in this disclosure, a trained model "parameters" are a set of parameters (e.g., weight and bias parameters of artificial neurons) that are learned according to a machine learning process. During the machine learning process, labeled training data is provided as an input to computer vision model, and the values of trained model parameters 144 are iteratively adjusted until the predictions generated by computer vision model to match the corresponding labels with a desired level of accuracy.

With continued reference to FIG. 1, in some embodiment, the computer vision model may be a pre-trained computer vision model. For example, computer vision model may be trained with a plurality of image representation and magnification level pairs. As described in this disclosure, different "magnification levels" may be associated with corresponding semantic meanings, the trained computer vision model may segment the image representation based on semantic meaning. In some embodiments, computer vision model may be trained to segment the image representation based on one or more of the perceptual characteristics such as brightness, gamma, intensity, and color. In some embodiments, the computer vision model, such as the computer vision model 180, is trained to segment the image representation based on the semantic meaning. For example, the computer vision model may be trained to segment the image representation to match the semantic meaning of the current magnification level (e.g., the macro structure level, the cell level, the organelle level) of the user, as described in the process. Thus, for example, when the semantic meaning corresponds to the tissue level, the computer vision model is trained to segment the image representation into regions with different tissue types; when the semantic meaning corresponds to the cell level, the computer vision model is trained to segment the image representation into regions with different cell types; and so forth. Improve the visibility for detail at various levels of magnification of a user. For example, the variability in tissue content, thickness, tissue type, etc., may result in a high variance in the perceptual clarity across the image.

Still referring to FIG. 1, during execution of processing pipeline 132, processor 108 executes a computer vision model 136. Computer vision model 136 is trained to make predictions based on input data. Computer vision model 180 includes a configuration 182. As used in this disclosure, a "configuration" is a plurality of layers of computer vision model 180 and the relationships among the layers. Illustrative examples of layers include input layers, output layers, convolutional layers, densely connected layers, merge layers, and the like. In some embodiments, computer vision model 180 may be configured as a deep neural network with at least one hidden layer between the input and output layers. Connections between layers can include feed-forward connections or recurrent connections.

Still referring to FIG. 1, one or more layers of computer vision model 136 may be associated with trained model parameters 144. The trained model parameters 144 are a set of parameters (e.g., weight and bias parameters of artificial neurons) that are learned according to a machine learning process. In some embodiments, the computer vision model 136 may be the supervised vision model or self-supervised vision model. During the machine learning process, labeled training data is provided as an input to computer vision model 136, and the values of trained model parameters 144 are iteratively adjusted until the predictions generated by computer vision model 136 to match the corresponding labels with a desired level of accuracy. For improved performance, processor 108 may execute computer vision model 136 using a graphical processing unit, a tensor processing unit, an application-specific integrated circuit, or the like.

Still referring to FIG. 1, system 100 includes computing device 104 configured to apply a segment-specific transformation to an individual segment in a first region 156. As used in this disclosure, a "segment-specific transformation" refers to a kind of transformation or adjustment that is applied to a certain segment of an image. For example, a brightness adjustment, contract enhancement, color correction, etc. As described in this disclosure, a "first region" refers to a specific area or portion of the image under consideration. The first region 156 may have multiple segments, and each segment may have its own unique visual characteristics. For example, to ensure that segment within this region have consistent perceptual quality, without vast disparities like one segment being too bright while others are too dim. In some embodiments, processor may automatically choose and execute a segment-specific transformation model which maximizes the perceptual quality in first region 156. For example, partly due to the difference in thickness, a first segment among the plurality of segments in first region 156 has high brightness while other segments among the plurality of segments in first region 156 have low brightness, the processor may automatically choose the segment-specific transformation for brightness adjustment. Specifically, segment-specific transformation will reduce the brightness of the first segment among the plurality of segments, and/or increase the brightness of other segments among the plurality of segments. In some embodiments, the similar process may be performed accordingly to reduce the high variance in perceptual characteristics among even various parts of the same segment.

With continued reference to FIG. 1, in an embodiment, processor 108 may execute the customized segment-specific transformation to the first segment in first region 156. The customized segment-specific transformation allows the user to have a fine-grained control over the transformation. For example, the customized segment-specific transformation may be executed to further improve the perceptual clarity in first region 156. When the user finds that first region 156 after the segment-specific transformation still has a high variance in perceptual clarity, the user may input feature data for a customized segment-specific transformation, and processor may use the feature data to perform a second-round transformation to the first segment and/or other segments among the plurality of segments to further improve perceptual clarity in first region 156. In an additional embodiment, segment-specific transformation further includes adjustment to contrast, brightness, gamma, saturation, and red, green, and blue (RGB) values. As a non-limiting example, a histology slide of a tissue sample where certain regions appear washed out due to uneven staining. User may utilize segment-specific transformation to selectively enhance the contrast in these washed-out regions, boost the brightness of darker areas for clearer visualization, adjust the gamma to bring out subtle details in the cellular structures, increase the saturation to highlight differences in tissue types, and fine-tune the RGB values to correct any color imbalances, ultimately resulting in a clearer and more detailed visualization of the tissue sample. In another embodiment, segment-specific transformation is applied in real time. As a non-limiting example, a live microscopic examination of a skin biopsy during a patient consultation. As user moves the slide under the microscope, certain areas may appear too dark or too light due to variations in tissue thickness or uneven lighting. Instead of manually adjusting microscope settings or relying on post-examination software corrections, segment-specific transformation automatically and instantaneously adjusts the contrast, brightness, and color values on the viewed image.

With continued reference to FIG. 1, computing device 104 is configured to apply the segment-specific transformation to an individual segment in a second region. As used in this disclosure, a "region" refers to a portion or section of a larger whole, delineated based on specific criteria or characteristics. As used in this disclosure, a "region" refers to a portion or section of a larger whole, delineated based on specific criteria or characteristics. In the context of biological samples or images, region can denote an area with a unique semantic meaning at the tissue level, indicating different types or functions of tissue within the sample. Additionally, a region can also be defined based on differences in thickness, such as areas of a sample or slide where the tissue or material is denser or more sparse compared to surrounding sections. In an embodiment, system further includes receiving feature data from a user as input. For example, In some embodiments, the segment-specific transformation model may further transform the second segment into a second processed segment by reducing its brightness. This may help in achieving a uniform visual perception across segments. System further includes applying a second segment-specific transformation to each segment of the plurality of segmentation in first region 156 of the whole slide image to manifest details of each segment in first region 156. For example, the transformed first segment and the transformed second segment have reduced variability in brightness and contrast, leading to a more consistent visual representation. By focusing the transformation at the segment level (e.g., the tissue level) rather than applying it to the entire image, the natural color gradient of different regions may be preserved.

With continued reference to FIG. 1, system 100 for color gamut normalization for pathology slide, computing device 104 is configured to retrieve a plurality of discrete magnification levels from a user. As used in this disclosure, "color gamut" is defined as the range of colors which a particular device can produce or record. It is usually shown by an enclosed area of the primary colors of the device on the chromaticity diagram. For example, the primary colors of monitors are red, green, and blue. Additionally, as used in this disclosure, "discrete magnification" is a predefined level or scale of enlargement that allows for detailed observation and analysis of samples or images. Discrete magnification may offer fixed stages or steps of magnification. Each level provides a distinct and separate view, ensuring consistent and reproducible visualization at that particular magnification. This is beneficial in scenarios where standardization and precision are required, such as in medical imaging, where specific magnification levels can be used to observe and analyze microscopic structures consistently and reliably. For instance, in the context of viewing a pathology slide, discrete magnification allows a user to quickly shift from a broader overview to a close-up examination of cellular structures. The precomputation of segment-specific transformations at these discrete levels may ensure users shift between magnifications.

With continued reference to FIG. 1, computing device 104 is configured to choose as a first magnification level from a plurality of discrete magnification levels and store the plurality of segmentation in a cache. As used in this disclosure, a "cache" is a specialized high-speed storage mechanism designed to provide quick data retrieval, improving system efficiency by reducing the need to fetch data from primary storage areas. Serving as an intermediary layer between primary storage and computation resources, caches store temporary copies of frequently accessed or recently retrieved data, anticipating future requests. As a non-limiting example, web caching in internet browsers, where recently or frequently visited web pages are temporarily stored. This allows users to load a previously visited page more swiftly since it can be fetched from the local cache instead of downloading it again from the internet. Another example may be application caching, where mobile and desktop applications often store user preferences, session data, and other recurrent information in caches to reduce loading times and provide a smoother user experience. Systems may dramatically decrease data access times when utilizing cache, thereby enhancing performance and user experience. In an embodiment, the whole slide image is segmented to match the first magnification level of a user may have their corresponding semantic meanings, hence the computer vision model may be executed to segment the image representation to match the semantic meaning of the current magnification level. The computer vision model may be a supervised vision model, a self-supervised vision model, and any other suitable models those skilled in the art will appreciate. When the image representation includes the biological tissue, a computer vision model may be used to perform semantic segmentation that is biologically relevant for the current level of magnification. The image representation may be segmented to match a current magnification level of the user to facilitate viewing of the underlying regions and structures that have relatively better visibility for details at that magnification level. For example, if a user is set at the first level (e.g., 40× magnification), the image representation may be segmented to match the first level (e.g., the cell level). As such, different cells in the image representation will be segmented into individual cells. If the user is then set at the other magnification level (e.g., the third level), the image representation may be segmented to match the third level (e.g., the organelle level). As such, different organelles in the image representation will be segmented into individual organelles.

With continued reference to FIG. 1, system 100 further include storing a segment bounding path of the plurality of segmentation and the segment-specific transformation as metadata in conjunction with the whole slide image for training a machine learning model. A "segment bounding path" is a defined boundary, often represented digitally as a sequence of coordinates or points, which encloses or demarcates a specific segment or region within an image. This bounding path helps in identifying and isolating the segment, allowing for precise modifications or analyses of the encapsulated content without affecting the surrounding areas. In the context of medical or pathology slides, the segment bounding path might outline areas of specific tissue types, abnormalities, or any other regions of interest. In a non-limiting Example, imagine a whole slide image of a tissue sample containing both healthy cells and tumor cells. The system identifies these different cell types and creates segmentations for them. For each segmentation, a segment bounding path is defined to circumscribe the particular region where these cells are located. This bounding path could be a simple geometric shape, like a circle or rectangle, or a more complex shape that closely follows the contours of the cell cluster. Another example may be a researcher is training a machine learning model to automatically identify and classify different cell types in similar tissue samples. Segment bounding paths and their associated segment-specific transformations, stored as metadata with the whole slide image as training data. For instance, the researcher may apply a transformation to enhance the visibility of tumor cells in a specific region, this information helps the model understand how tumor cells look both in their natural state and post-transformation. Over time, as the model exposed to numerous examples with associated bounding paths and transformations, it may become adept at recognizing and categorizing different cell types in new, unseen slide images.

Figure 2:
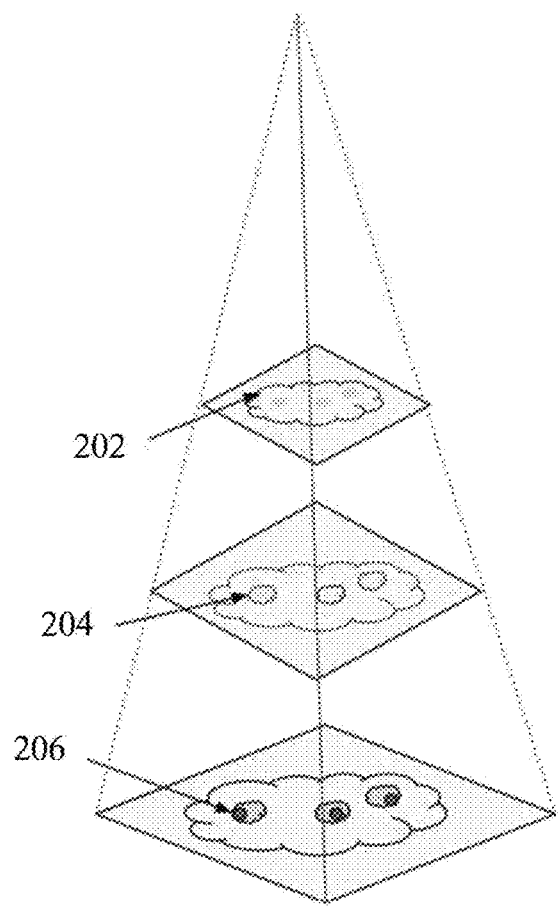
FIG. 2 illustrates an exemplary embodiment of a simplified system for color gamut normalization for digital slides.

Referring now to FIG. 2, an exemplary embodiment of a simplified system for color gamut normalization for digital slides is illustrated. For example, the user may be used to view different biological organizations (e.g., tissue, cells, organelles, bacteria, viruses, etc.) at different magnification levels. In some embodiments, each level may have a corresponding semantic meaning as described below.

With continued reference to FIG. 2, the first level 202, the magnification may be sufficient to view macro structures of tissue. Typically, the size of tissue is over 100 m. In some embodiments, a 40× magnification may be used to see macro structures of tissue under a user. In some embodiments, the first level 202 may be associated with a semantic meaning and may be called the tissue level.

With continued reference to FIG. 2, at the second level 204, the magnification may be sufficient to view a single cell 105. Typically, the size of cells ranges from 1-100 μm. For instance, yeast cells are 3-4 μm in diameter, and human red blood cells are 7-8 m in diameter. In some embodiments, a 400× magnification (assuming 10× eyepiece and 40× objective lens) may be used to see a single cell under a user. In some embodiments, the second level 204 may be associated with a semantic meaning and may be called the cell level.

With continued reference to FIG. 2, at the third level 206, the magnification may be sufficient to view organelles within cells. Organelles within cells may include the nucleus, mitochondria, lysosomes, the endoplasmic reticulum, and the Golgi apparatus. Typically, the size of organelles ranges from 100 nm-1 μm. In some embodiments, a 640× magnification may be used to see a mitochondrion under a user. In some embodiments, the third level 206 may be associated with a semantic meaning and may be called the organelle level.

Still referring to FIG. 2, magnification levels 202 to 206 illustrates and that many other magnification levels (or ranges of magnification levels) and their corresponding semantic meanings may be possible. In some embodiments, the magnification levels of a digitized user may be continuous over a range of magnification levels (e.g., continuously adjustable from 2× to 500× magnification). In some embodiments, the magnification levels may be selected from a discrete set of magnification levels (e.g., 50×, 400×, 640× magnifications).

Figure 3:
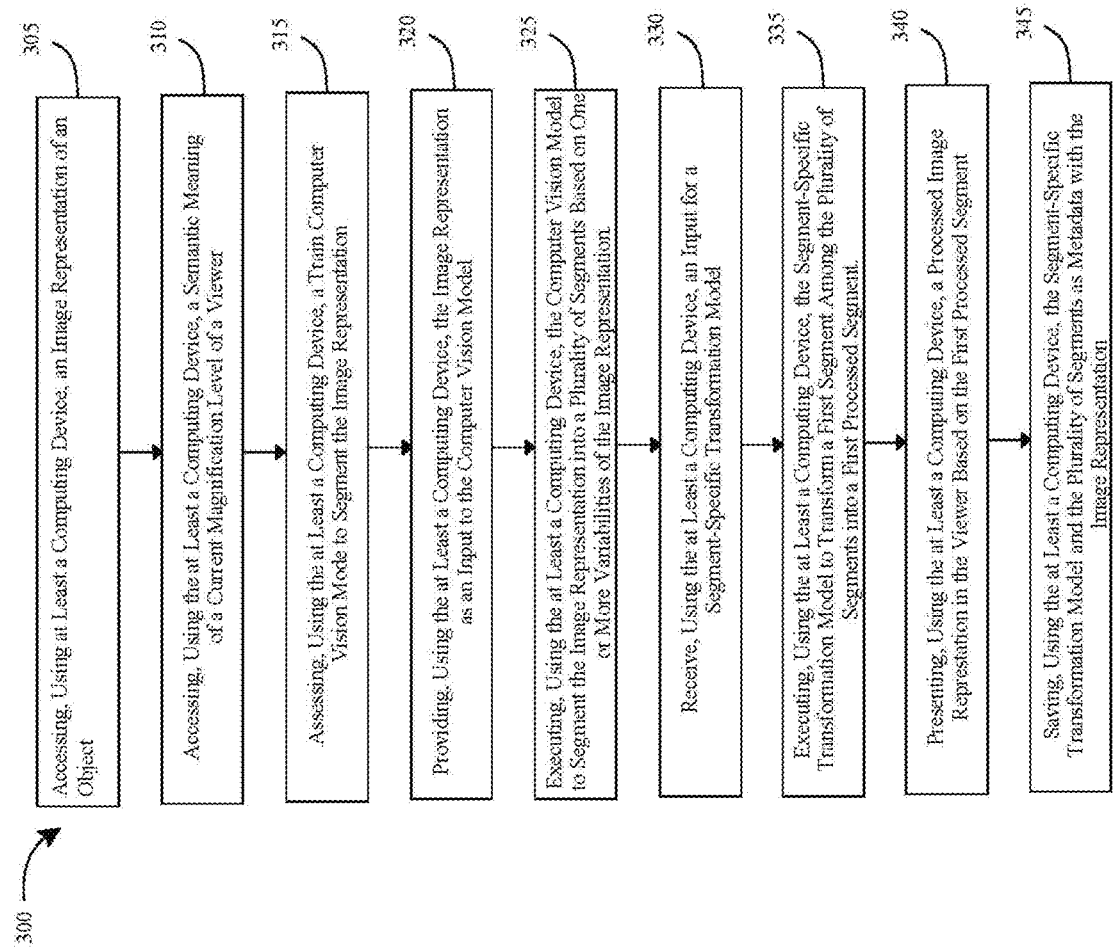
FIG. 3 is a flow diagram illustrating an exemplary work flow in one embodiment for providing a processed image representation to a user.

Referring now to FIG. 3, a flow diagram of an exemplary method 300 for providing a processed image representation to a user is illustrated, such as a user described in FIG. 2, in accordance with certain embodiments of the present disclosure. Method 300 may be performed by a processor. Method 300 includes step 305 of accessing, using at least a computing device 104, an image representation of an object. For example, the image representation of the object may be a digital slide. Illustrative embodiments of accessing an image representation of an object are described below with reference to FIG. 4. This may be implemented, without limitation, as described above with reference to FIGS. 1-2.

With continued reference to FIG. 3, method 300 includes a step 310 of accessing, Using the at least a computing device 104, a semantic meaning of a current magnification level of a user. A user may use the user to view a digital slide at different magnification levels, and a plurality of magnification level may have corresponding semantic meanings. Viewing a slide at a higher magnification level indicates that more details of an object will appear in the user. A magnification level may have a corresponding semantic meaning because it may be optimal to view some details of the object at that magnification level. For example, a 2× magnification may be optimal to view the macro structure of an apple, hence the 2× magnification level may be called macro structure level. This may be implemented, without limitation, as described above with reference to FIGS. 1-2.

With continued reference to FIG. 3, method 300 includes a step 315 of assessing, using the at least a computing device 104, a train computer vision mode to segment the image representation. A computer vision model, such as computer vision model, may be trained to segment the image representation is accessed. In computer vision, object detection or object recognition refers to detecting the existence of an object or multiple objects, their categories, and their locations. As one application of object detection technology, segmentation may be used to identify clusters of pixels in the image representation that correspond to the same entity. Segmentation may be used to identify the contour of an apple, a car, a person, etc. A user is often used to viewing the structure of an object at different magnification levels. A more magnified level indicates that more detailed structures will appear in a user, hence a user needs to spend time finding the location of the structure he might be interested in. The user is likely to repeat this process every time he wants to move the lens to the other regions. As an alternative, the application of segmentation as an object detection technology frees the user from the time-consuming burden of finding the structure(s) in the user, and the user may focus on the structure(s) in the user directly. Illustratively, segmenting the image representation of an object may include figuring out the bounding path (e.g., contour) of the object. Accordingly, the computer vision model may be trained to identify the bounding path of the object. An example of a computer vision model that can identify the bounding path of an object in this manner is the DINO model, which is described in Mathilde Caron et. al, *Emerging Properties in Self-Supervised Vision Transformers*, Computer Vision and Pattern Recognition, 2021, which is incorporated by reference herein in its entirety. This may be implemented, without limitation, as described above with reference to FIGS. 1-2.

With continued reference to FIG. 3, method 300 includes a step 320 of providing, using the at least a computing device 104, the image representation as an input to the computer vision model. the image representation is provided as an input to the computer vision model. Various pre-processing steps may be performed to prepare the image representation for the computer vision model. These pre-processing steps may include cropping and/or padding the image representation to fit a predetermined aspect ratio, scaling the dimensions of image representation to fit a predetermined size, or the like. This may be implemented, without limitation, as described above with reference to FIGS. 1-2.

With continued reference to FIG. 3, method 300 includes a step 325 of executing, using the at least a computing device 104, the computer vision model to segment the image representation into a plurality of segments based on one or more variabilities of the image representation. the computer vision model is executed to segment the image representation into a plurality of segments based on one or more variabilities of the image representation. The one or more variabilities may include shape, contour, content type, thickness, etc. One or more of the variabilities may manifest one or more perceptual characteristics such as brightness, gamma, intensity and color. In some embodiments, the computer vision model may be executed using specialized computing hardware, such as a graphics processing unit (GPU) or an application-specific integrated circuit (ASIC). In some embodiments, the computer vision model is executed to segment the image representation based on a pre-trained computer vision model. In some embodiments, the computer vision model is executed to segment the image representation based on one or more of the perceptual characteristics such as brightness, gamma, intensity and color. In some embodiments, the user may set the user at a specific magnification level to view the structure of the object for a specific detailed structure (e.g., use coarse magnification level to view the general structure, use detailed magnification level to view the more detailed structure). This may be implemented, without limitation, as described above with reference to FIGS. 1-2.

With continued reference to FIG. 3, method 300 includes a step 330 of receive, using the at least a computing device 104, an input for a segment-specific transformation model. An input for a segment-specific transformation model, such as the segment-specific transformation model 190 is received. The one or more variabilities of the image representation results in a high variance in the perceptual clarity across the entire span of the digital representation of the object. The variance in the perceptual clarity may be measured by the one or more of the perceptual characteristics such as brightness, gamma, intensity and color. For example, some segments among the plurality of segment may have high brightness while other some segments may have low brightness, resulting in high var. Methods used in the industry like global transformations on the image representation may be limited in practice given this variability because they tend to make some segments perceptually clear while making others less clear perceptually. One way to circumvent this issue is to make manual adjustments to the transformations specific to each region to best view that region (e.g., the first region). However, this approach may be time consuming and may distract the user from the task of examining the image representation. Further, manual adjustments to the transformations specific to each region still makes some segments in that region perceptually clear while making others less clear. The application of segment-specific transformation as an alternative method frees the user from the time-consuming burden of manual adjustment, instead, the user may focus on the object(s) in the user directly. The segment-specific transformation normalizes the perceptual characteristics of each segment, thus reducing the variance in the perceptual clarity across the entire span of the digital representation of the object. In some embodiments, the user may manually select, through a user, a specific type of segment-specific transformation model as the input to the processing pipeline. The segments specific transformation models to choose from may include contrast, brightness, gamma, saturation, and red, green and blue (RGB) value, etc. Such transformation models are for illustrative purpose only, and person of ordinary skill in the art will appreciate that other forms of segment-specific transformations may also be applied. In some embodiments, the user may specify feature data for a customized segment-specific transformation model as the input to the processing pipeline. This may be implemented, without limitation, as described above with reference to FIGS. 1-2.

With continued reference to FIG. 3, method 300 includes a step 335 of executing, using the at least a computing device 104, the segment-specific transformation model to transform a first segment among the plurality of segments into a first processed segment. the segment-specific transformation model is executed to transform a first segment among the plurality of segments into a first processed segment. In some embodiments, the first segment may be located in first region 156 of the image representation (e.g., POV). This may be implemented, without limitation, as described above with reference to FIGS. 1-2.

With continued reference to FIG. 3, method 300 includes a step 340 of presenting, using the at least a computing device 104, a processed image representation in the user based on the first processed segment. a processed image representation, such as the processed image representation 151, is presented based on the first processed segment under the user. According to some embodiments, one or more processes of method 300 may be repeated until all segments of the plurality of segments are processed into a plurality of processed segments, and the plurality of processed segments may be combined to form a processed image representation. This may be implemented, without limitation, as described above with reference to FIGS. 1-2.

With continued reference to FIG. 3, method 300 includes a step 345 of saving, using the at least a computing device 104, the segment-specific transformation model, and the plurality of segments as metadata with the image representation. the segment-specific transformation model and the plurality of segments (e.g., bounding path, the contours of the segments) are saved as additional metadata with the image representation in a database, such as the database 110. The additional metadata may be used as training set for the computer vision model, the transformation model, and any other machine learning models, especially when the image representation is treated as one tile of an image representation of an even larger object. This may be implemented, without limitation, as described above with reference to FIGS. 1-2.

Figure 4:
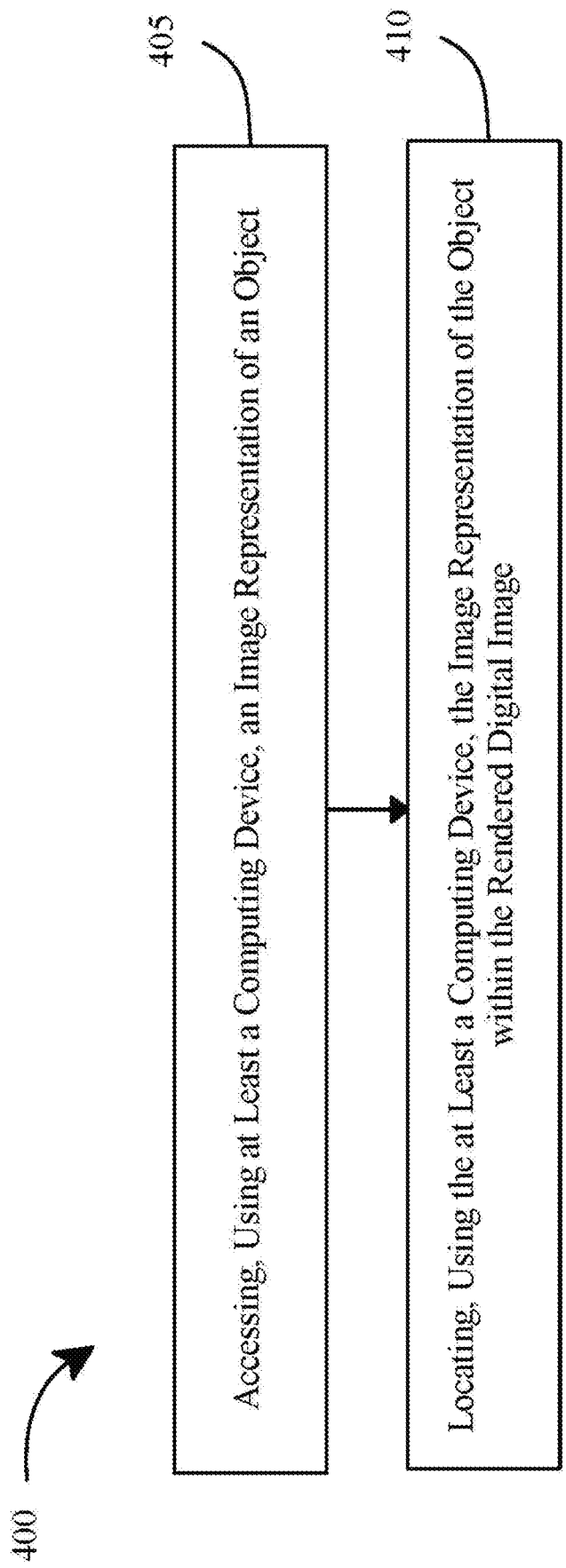
FIG. 4 is a flow diagram illustrating an exemplary work flow in one embodiment for accessing an image representation of an object.

Referring now to FIG. 4, a flow diagram of an exemplary method 400 for accessing an image representation of an object is illustrated. Method 400 includes step 405 of receiving, using the at least a computing device 104, a digital image via a computer network. A digital image may be received via a computer network, such as network 128. The digital image can be transmitted and received in a variety of image formats (e.g., JPEG, PNG, TIFF image). A format conversion engine may be selected to transform the digital image into a uniform image independent of the format of the received digital image 148. In this manner, flexibility is provided to handle a wide variety of format types of received digital image 148. This may be implemented, without limitation, as described above with reference to FIGS. 1-3.

With continued reference to FIG. 4, method 400 includes a step 410 of locating, using the at least a computing device 104, the image representation of the object within the rendered digital image. The image representation of a plurality of objects may be located within the rendered digital image. Those skilled in the art may appreciate that a wide variety of object detection techniques may be used to locate an image representation of the plurality of objects within a digital image. According to some embodiments, a second computer vision model may be trained to detect and localize the object, or multiple objects, within digital image 148. This second computer vision model can then be executed using the digital image 148 as an input to predict the location of the image representation of the object(s). For example, a bounding box, a rectangle that surrounds an object, may be used to specify its position, class (e.g., car, person) and confidence (how likely it is to be at that location). The located object(s) may be output as the image representation of the object(s). This may be implemented, without limitation, as described above with reference to FIGS. 1-3.

Figure 5:
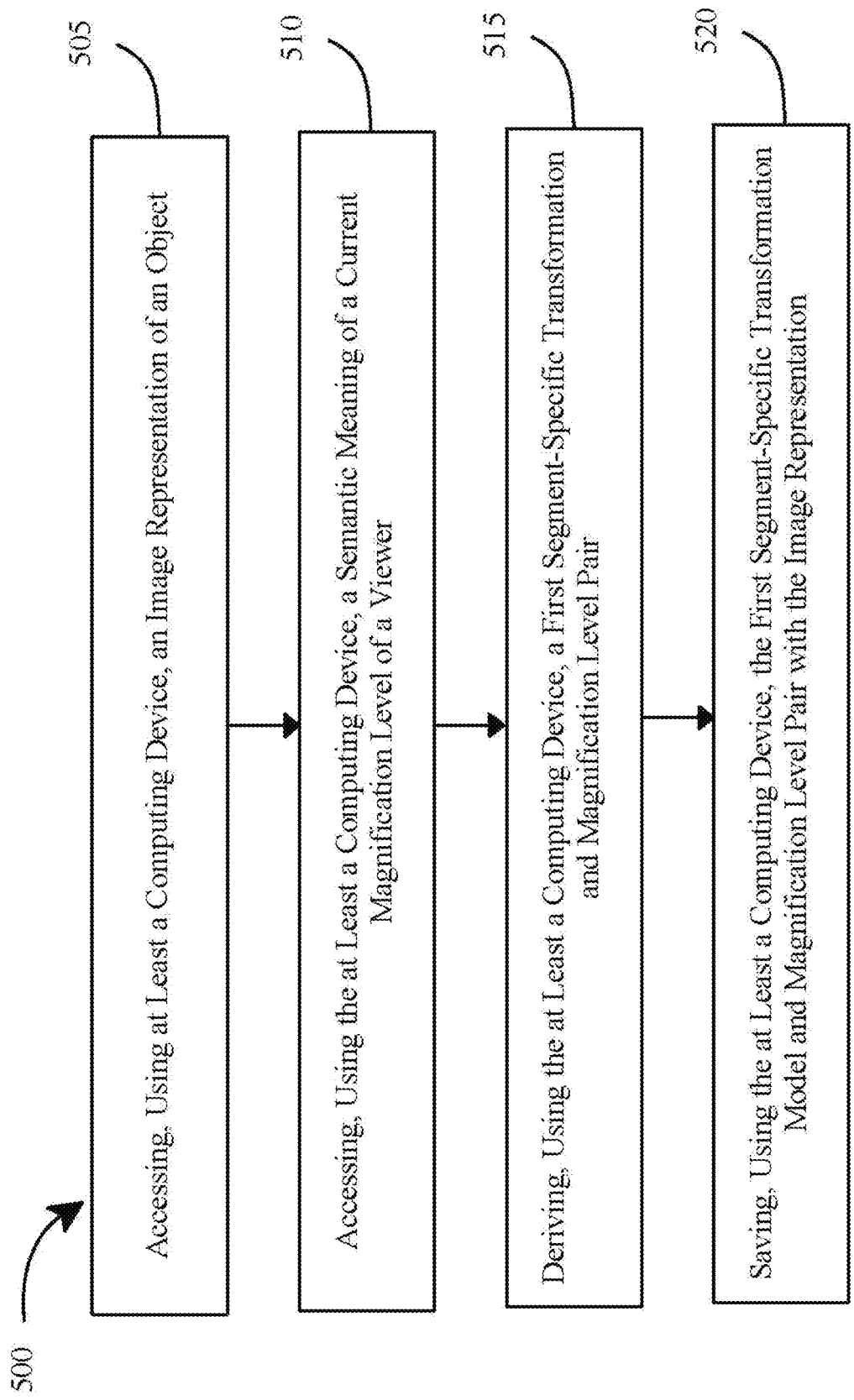
FIG. 5 is a flow diagram illustrating an exemplary work flow in one embodiment for providing segment-specific transformation and magnification level pairs.

Referring now to FIG. 5, a flow diagram of an exemplary method 500 for providing segment-specific transformation and magnification level pairs is illustrated. When the user is viewing the image representation of the object, he may experience less smooth user experience because he has to wait while some or all of the processes described in FIG. 3-4 may be performed in the backend. Alternatively, the segment-specific transformation at discrete magnification levels may be precomputed to further improve the user experience. Instead of computing the segment-specific transformation on the fly, processor may simply fetch the segment-specific transformation based on the magnification level to save time. In some embodiments, a plurality of transformation-magnification level pairs, together with the image representation of the object may be stored in a database, such as the database, so that the processed image representation may be presented in a much faster manner. Method 500 includes step 505 of accessing, using the at least a computing device 104, an image representation of an object. This may be implemented, without limitation, as described above with reference to FIGS. 1-4.

With continued reference to FIG. 5, method 500 includes step 510 of accessing, using the at least a computing device 104, a plurality of semantic meaning corresponding with a plurality of magnification levels of a user. Some or all of the plurality of magnification levels correspond with a semantic meaning respectively as described in accordance with FIGS. 2-3. For example, the first level 202, the second level 204 and the third level 206 of the user 111 may correspond with the macro structure level, the cell level, and the organelle level respectively. This may be implemented, without limitation, as described above with reference to FIGS. 1-4.

With continued reference to FIG. 5, method 500 includes step 515 of deriving, using the at least a computing device 104, a first segment-specific transformation and magnification level pair. The processor may perform some or all of the processes described in FIGS. 3-4 to derive the segment-specific transformation based on the semantic meanings associated with the magnification level. For example, the first level 202 may have the semantic meaning of macro-structure level. Based on the macro-structure level, the processor may perform some or all of the processes described in FIGS. 3-4 to derive the corresponding segment-specific transformation, thus forming a first segment-specific transformation and magnification level pair. This may be implemented, without limitation, as described above with reference to FIGS. 1-4.

With continued reference to FIG. 5, method 500 includes step 520 of saving, using the at least a computing device, the first segment-specific transformation model and magnification level pair with the image representation. In some embodiments the plurality of pairs and the image representation may be saved in a database and/or a memory. As such, before performing some or all the processes described in accordance with FIGS. 3-4, the processor may first determine whether the segment-specific transformation matching the current magnification level is stored in the database and/or the memory. In response to determining that the segment-specific transformation matching the current magnification level is stored in the database and/or the memory, the processor may simply retrieve the segment specific transformation, thus avoiding performing some or all the steps described in accordance with FIGS. 3-4. In response to determining that the segment-specific transformation matching the current magnification level is not stored in the database and/or the memory, the system may perform some or all of the processes described in accordance with FIGS. 3-4 in real time. In such dynamic cases, transformed regions are incrementally rendered in parallel or in sequence based on the size and the number of segments in the current field of view. Regions adjacent to first region within the current magnification level and the nearest discrete magnification levels are precomputed to improve the experience. Optionally, system may further store the generated segment-specific transformation and magnification level into the database and/or the memory for future use. This may be implemented, without limitation, as described above with reference to FIGS. 1-4.

Still referring to FIG. 5, in response to determining that the segment-specific transformation matching the current magnification level is not stored in the database and/or the memory, the system may perform some or all of the processes described in accordance with FIGS. 3-4 in real time. In such dynamic cases, transformed regions may be incrementally rendered in parallel or in sequence based on the size and the number of segments in the current field of view. Regions adjacent to first region 156 within the current magnification level and the nearest discrete magnification levels are precomputed to improve the experience. Optionally, system may further store the generated segment-specific transformation and magnification level into the database and/or the memory for future use.

In some embodiments, system may automatically perform some or all the steps described in accordance with FIGS. 3-4 as the user transitions at different regions at a given magnification (e.g., from the first region to other regions), thus encompassing same or different histological tissue types. In some embodiments, the system may automatically perform some or all the processes described in accordance with FIGS. 3-4 as the user transitions from one magnification level to the other magnification level at a given region (e.g., from the first level to the second level), thus encompassing the different level of details.

Figure 6:
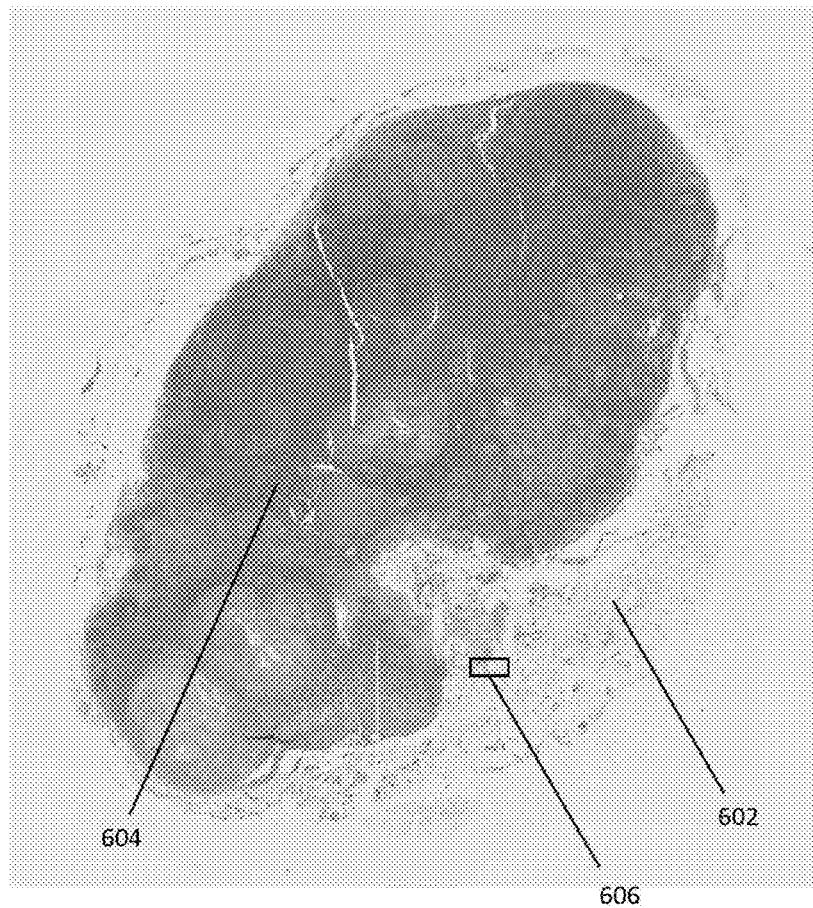
FIG. 6 illustrate an exemplary embodiment image of the original object view at a magnification level.

Referring now to FIG. 6, an exemplary embodiment image of the original object view at a magnification level is illustrated. In some embodiments consistent with FIGS. 1-5, the image representation of the object may correspond to the image representation, e.g., as described above with reference to process 302. As depicted in FIG. 6, there are two regions 602 and 604, and the regions 602 and 604 may indicate different tissue types. For example, the region 602 may indicate the adipose tissue and the region 602 may indicate tumor tissue. The regions 602 and 604 may manifest high variance in perceptual clarity, which may be measured by one or more perceptual characteristics (e.g., brightness). For example, the region 602 (e.g., the adipose tissue) has a higher brightness than that of the region 604 due to the difference in thickness.

Figure 7:
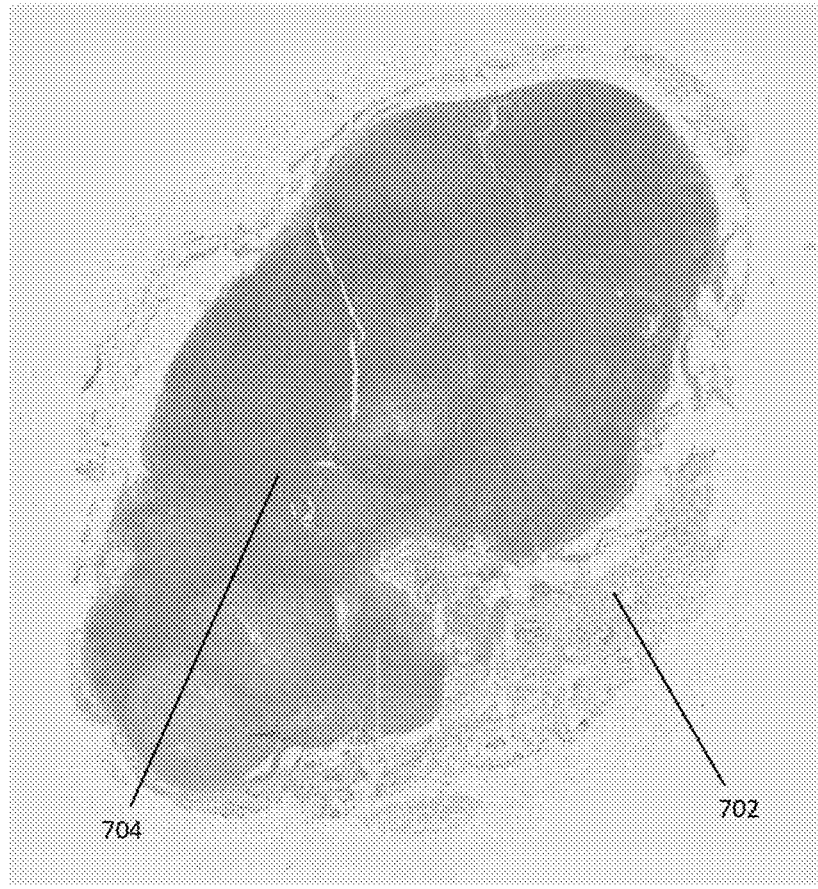
FIG. 7 illustrate an exemplary embodiment image of a processed image representation described in FIG. 6.

Referring now to FIG. 7, the image representation described in FIG. 6 processed by a color normalization process based on perceptual features and without using autonomous, segment specific transformations as described above with reference to FIGS. 1-5. The color normalization process may transform the region 602 into a transformed region 702 and may transform the region 604 into a transformed region 704 by changing the one or more perceptual characteristics of the WSI. As depicted in FIG. 7, the approach of using global transformation of the whole WSI, rather than the segment-specific transformations described above, is suboptimal because it tends to make some regions perceptually clear while making other regions less clear, also it tends to make the entire image representation of the object look similar. For example, compared with the original region 604, the transformed region 704 is less perceptually clear. As the other example, compared with the original region 602, the transformed region 702 loses its original color gradient by indicating an unnatural pink hue.

Still referring to FIG. 7, manual and regional transformation based on perceptual characteristics—which also do not use autonomous, segment-specific transformations as described above with reference to FIGS. 1-5—is also less optimal, because diagnostically meaningful interpretation of WSI in digital pathology should be made on semantically similar aggregate based on biological features (e.g., ducts, stroma, adipose tissue) rather than perceptually similar features (e.g., color, saturation, intensity, gamma). Hence there is a desire in digital pathology to view the WSI based on semantically meaningful biological features. For example, the WSI may be segmented based on the semantical meaning associated with the magnification level of user.

Figure 8:
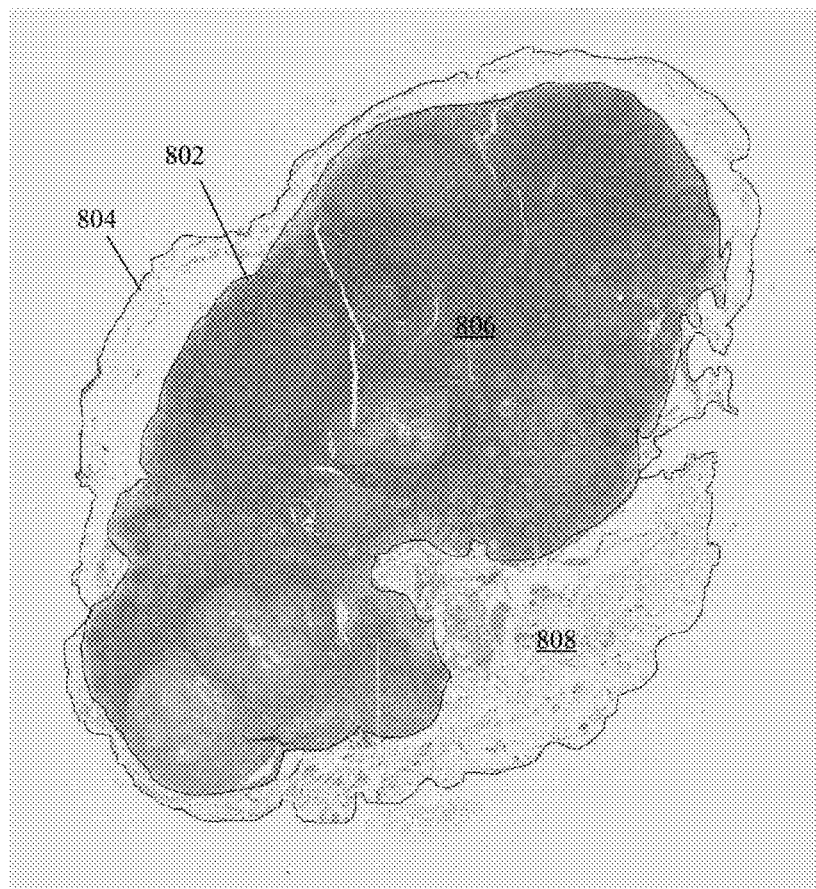
FIG. 8 illustrate an exemplary embodiment image of a segmented image representation described in FIG. 6.
Figure 9:
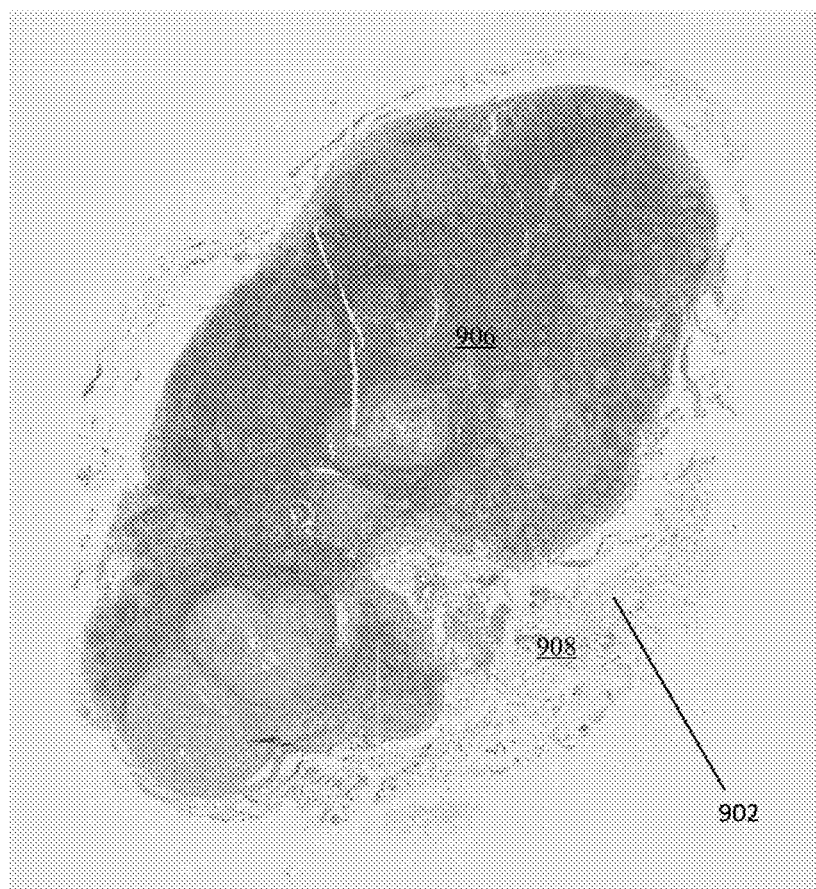
FIG. 9 illustrate an exemplary embodiment image of transformed image representation described in FIG. 6.

Referring now to FIGS. 8 and 9, the segmented image representation described in FIG. 6 is illustrated, in accordance with certain embodiments of the present disclosure. In contrast to FIG. 7, FIGS. 8 and 9 illustrate the effects of processing an image representation using autonomous, segment specific transformations as described above with reference to FIGS. 1-5. Specifically, FIG. 8 illustrates the segmentation of the image representation shown in FIG. 6 based on magnification level, and FIG. 9 illustrates the result of applying a segment-specific transformation to the image representation in FIG. 8. As shown in FIG. 8, the image representation is segmented to match the semantic meaning of the magnification level. In some embodiments consistent with FIGS. 1-5, the magnification level may correspond to the first level 202, which has the semantic meaning of tissue level, e.g., as described above with reference to process 304. The computer vision model, such as the DINO, may be executed to segment the image representation based on the difference in thickness to match the magnification level, e.g., as described above with reference to processes 306-310. Specifically, the computer vision model may segment the image representation into a first segment 806 and a second segment 808, which have different thickness, by identifying a first bounding path 802 and a second bounding path 804. The first segment 806 may represent the first region (e.g., the region 604) and the second segment 808 may represent the second region 160 (e.g., the region 602).

Referring now to FIG. 9, in some embodiments consistent with FIGS. 1-5, a segment-specific transformation model, such as the segment-specific transformation model, is executed to transform the first segment 806 into a first processed segment 906, e.g., as described above with reference to processes 314-316. Specifically, the segment-specific transformation model may transform the first segment 806 into a first processed segment 906 by increasing its brightness. For example, as contrasted with the region 702 of the image representation processed by the approach in FIG. 7, the region 902 keeps the same natural color gradient of the region 602 of the image representation of the original object.

Figure 10:
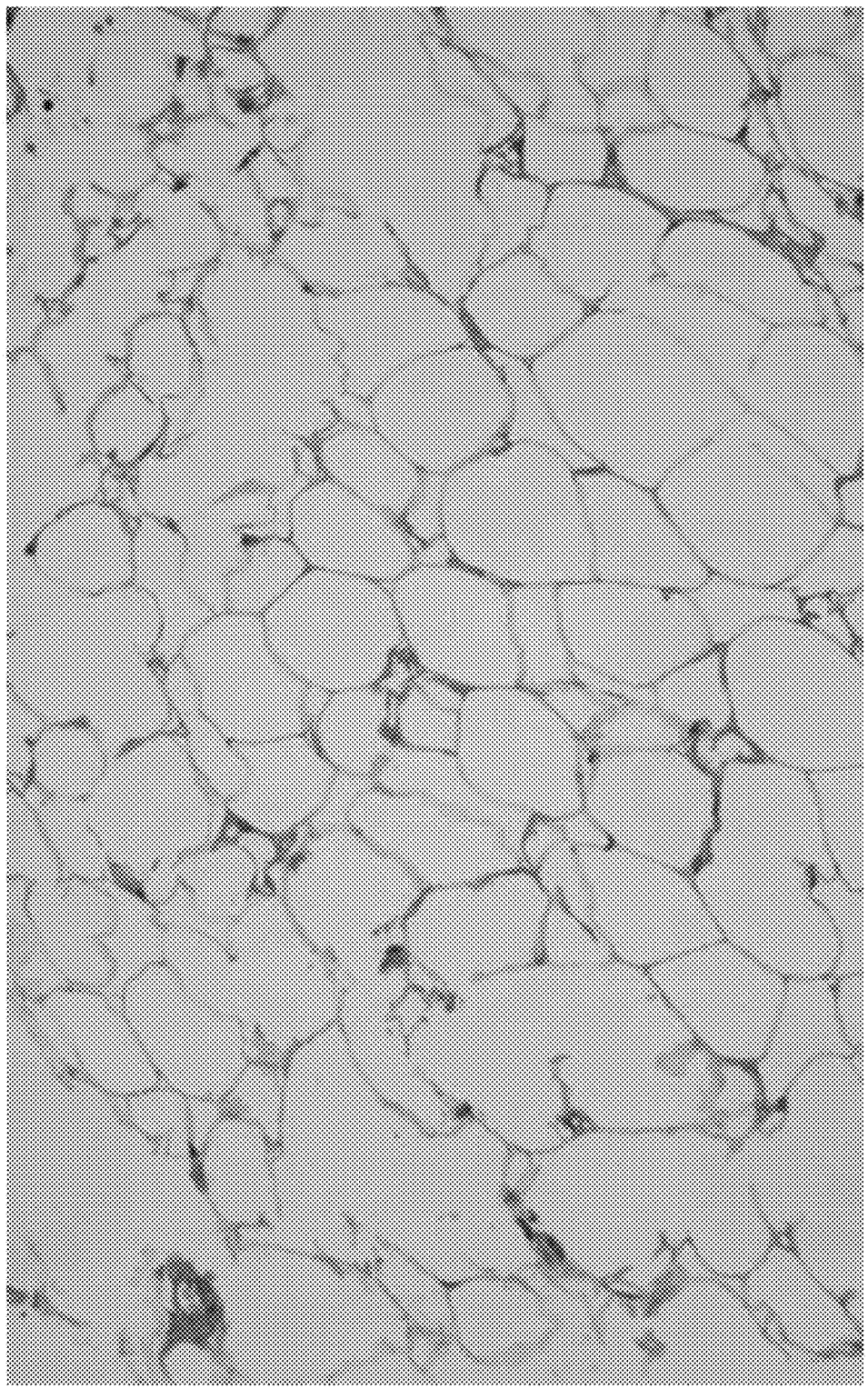
FIG. 10 illustrate an exemplary embodiment image of a region representation described in FIG. 6.

Still referring to FIG. 10, a region of the image representation described in FIG. 6, in accordance with certain embodiments of the present disclosure is illustrated. In some embodiments consistent with FIG. 6, a region may correspond to a region 606 which the user may be interested in, and the user may magnify the user from the first level 202 to the second level 204 to view the more detailed structure in the region 606. In some embodiments consistent with FIGS. 1-5, the second level 204 may have the semantic meaning of cell level and the computer vision model may be executed to segment the image representation to the cell level, e.g., as described above with reference to processes 304-310. As shown in FIG. 10, the cell manifests high variance in one or more perceptual characteristics (e.g., brightness). A segment-specific transformation model is then executed to transform a segment into a processed segment, e.g., as described above with reference to processes 314-316. According to some embodiments, one or more processes of method 300 may be repeated until all segments of the plurality of segments are processed into a plurality of processed segments, and the plurality of processed segments may be combined to form a processed image representation.

Figure 11:
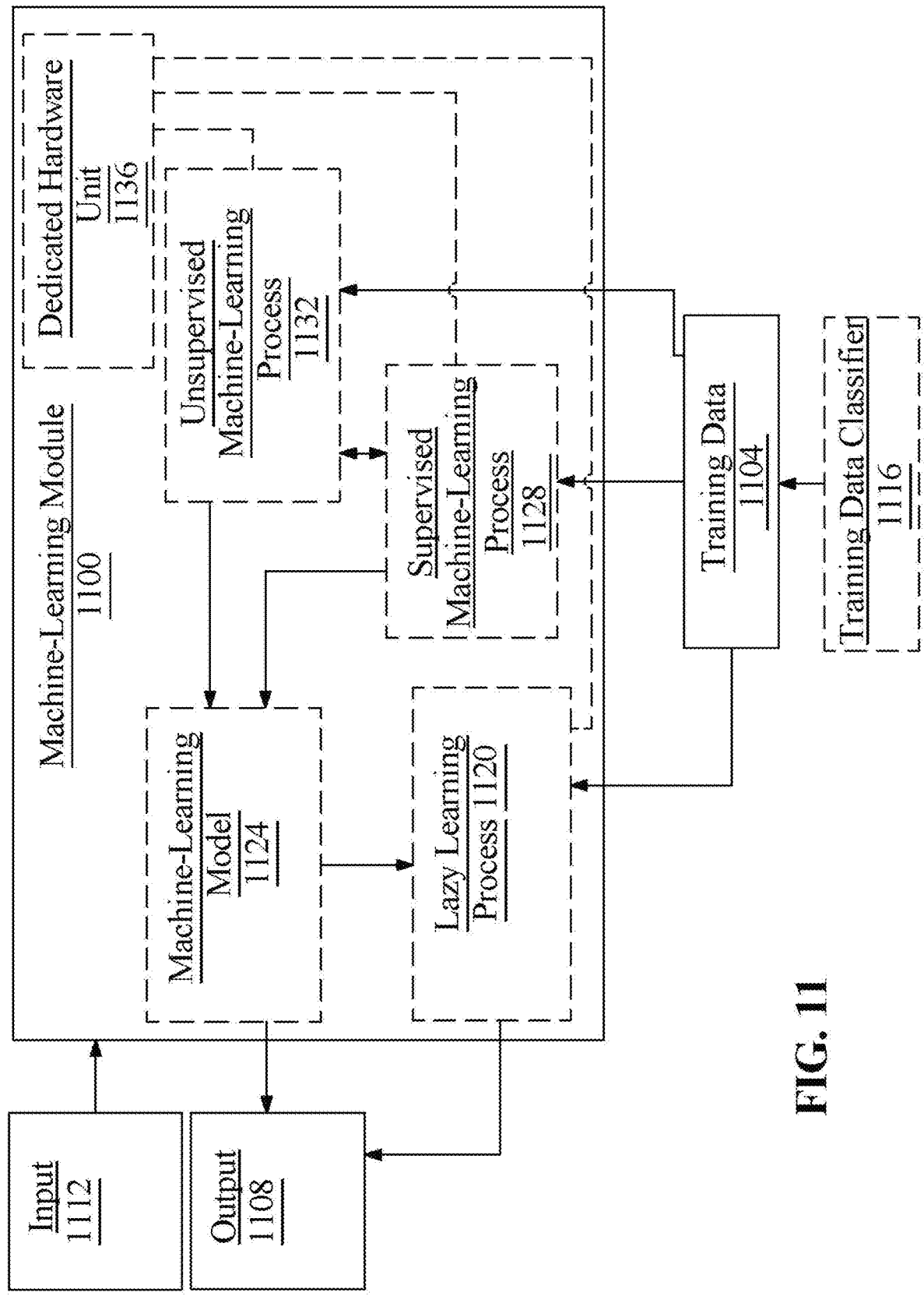
FIG. 11 is a block diagram of an exemplary machine-learning process.

Referring now to FIG. 11, an exemplary embodiment of a machine-learning module 1100 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1104 to generate an algorithm instantiated in hardware or software logic, data structures, and/or functions that will be performed by a computing device/module to produce outputs 1108 given data provided as inputs 1112; this is in contrast to a non-machine learning software program where the commands to be executed are determined in advance by a user and written in a programming language.

Still referring to FIG. 11, "training data," as used herein, is data containing correlations that a machine-learning process may use to model relationships between two or more categories of data elements. For instance, and without limitation, training data 1104 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 1104 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1104 according to various correlations; correlations may indicate causative and/or predictive links between categories of data elements, which may be modeled as relationships such as mathematical relationships by machine-learning processes as described in further detail below. Training data 1104 may be formatted and/or organized by categories of data elements, for instance by associating data elements with one or more descriptors corresponding to categories of data elements. As a non-limiting example, training data 1104 may include data entered in standardized forms by persons or processes, such that entry of a given data element in a given field in a form may be mapped to one or more descriptors of categories. Elements in training data 1104 may be linked to descriptors of categories by tags, tokens, or other data elements; for instance, and without limitation, training data 1104 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 11, training data 1104 may include one or more elements that are not categorized; that is, training data 1104 may not be formatted or contain descriptors for some elements of data. Machine-learning algorithms and/or other processes may sort training data 1104 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1104 to be made applicable for two or more distinct machine-learning algorithms as described in further detail below. Training data 1104 used by machine-learning module 1100 may correlate any input data as described in this disclosure to any output data as described in this disclosure. As a non-limiting illustrative example, training data 1104 may include digital pathology slide images as its input data. These images would contain a variety of tissue samples, each representing different cellular formations, staining, and potential abnormalities. On the other hand, the output data associated with each input image could be annotations or labels indicating the type of tissue, presence or absence of cellular abnormalities, and even the stage or severity of any detected abnormality.

Further referring to FIG. 11, training data may be filtered, sorted, and/or selected using one or more supervised and/or unsupervised machine-learning processes and/or models as described in further detail below; such models may include without limitation a training data classifier 1116. Training data classifier 1116 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 1100 may generate a classifier using a classification algorithm, defined as a processes whereby a computing device and/or any module and/or component operating thereon derives a classifier from training data 1104. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 1116 may classify elements of training data based on specific markers that are indicative of these early-stage cellular abnormalities. These markers might include cellular morphology, staining patterns, or even the density of particular cellular formations on a pathology slide.

Still referring to FIG. 11, computing device 1104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)$ P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device 1104 may then calculate a likelihood table by calculating probabilities of different data entries and classification labels. Computing device 1104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 11, computing device 1104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 11, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 11, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 11, computer, processor, and/or module may be configured to preprocess training data. "Preprocessing" training data, as used in this disclosure, is transforming training data from raw form to a format that can be used for training a machine learning model.

Preprocessing may include sanitizing, feature selection, feature scaling, data augmentation and the like.

Still referring to FIG. 11, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, standardization may include utilizing algorithms for identifying duplicate entries or spell-check algorithms.

As a non-limiting example, and with further reference to FIG. 11, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 11, computing device, processor, and/or module may be configured to precondition one or more training examples. For instance, and without limitation, where a machine learning model and/or process has one or more inputs and/or outputs requiring, transmitting, or receiving a certain number of bits, samples or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 11, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 11, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 11, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $X_{max}$:

$$X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 11, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 11, machine-learning module 1100 may be configured to perform a lazy-learning process 1120 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1104. Heuristic may include selecting some number of highest-ranking associations and/or training data 1104 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 11, machine-learning processes as described in this disclosure may be used to generate machine-learning models 1124. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 1124 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1124 may be generated by creating an artificial neural network, such as a convolutional neural network comprising an input layer of nodes, one or more intermediate layers, and an output layer of nodes. Connections between nodes may be created via the process of "training" the network, in which elements from a training data 1104 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 11, machine-learning algorithms may include at least a supervised machine-learning process 1128. At least a supervised machine-learning process 1128, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include input as described in this disclosure as inputs, output as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1104. Persons skilled in the art, upon reviewing the entirety of this disclosure, will be aware of various possible variations of at least a supervised machine-learning process 1128 that may be used to determine relation between inputs and outputs. Supervised machine-learning processes may include classification algorithms as defined above.

With further reference to FIG. 11, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 11, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 11, machine learning processes may include at least an unsupervised machine-learning processes 1132. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 1132 may not require a response variable; unsupervised processes 1132 may be used to find interesting patterns and/or inferences between variables, to determine a degree of correlation between two or more variables, or the like.

Still referring to FIG. 11, machine-learning module 1100 may be designed and configured to create a machine-learning model 1124 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 11, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 11, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 11, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 11, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 11, one or more processes or algorithms described above may be performed by at least a dedicated hardware unit 1136. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 1136 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 1136 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 1136 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 12:
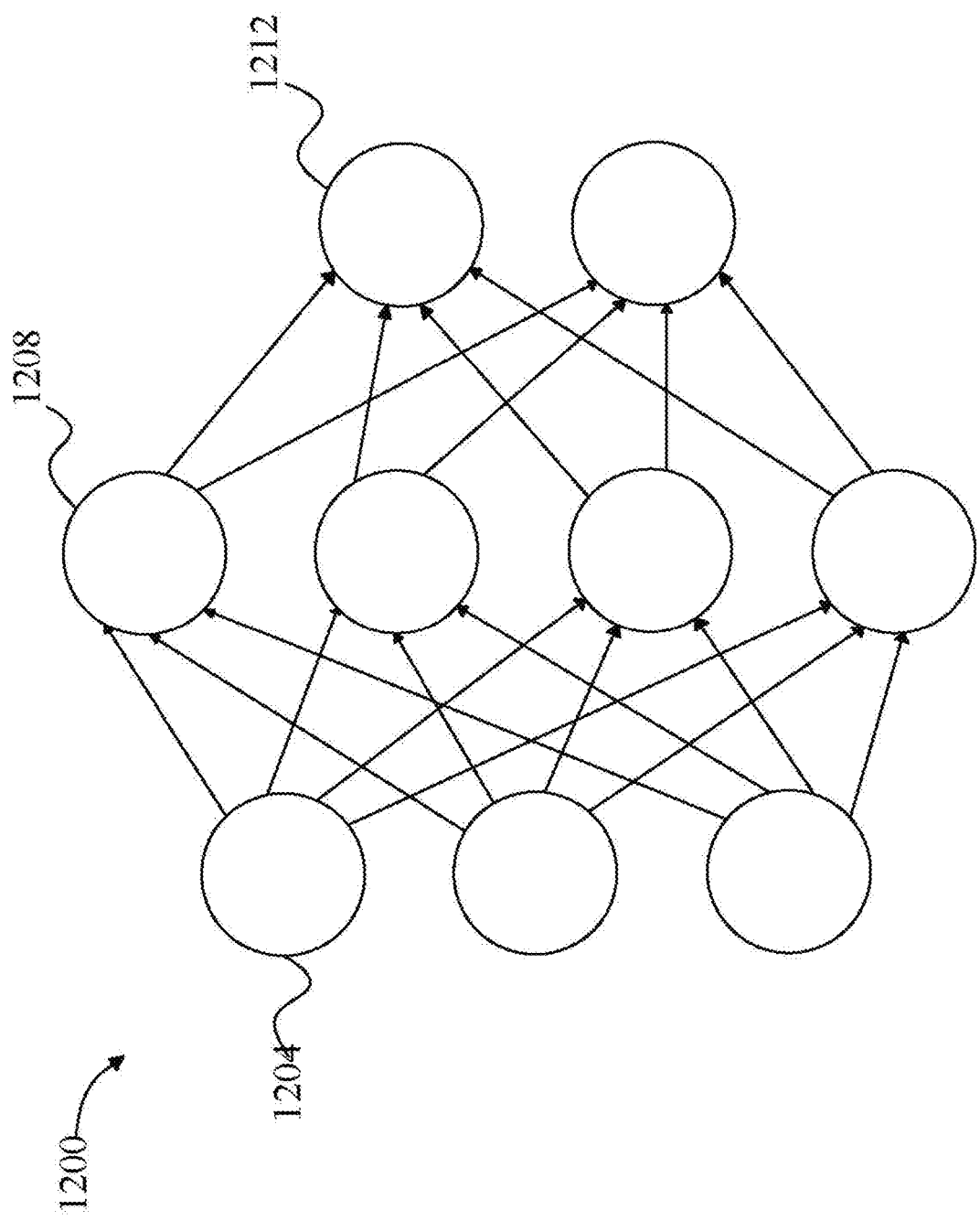
FIG. 12 is a diagram of an exemplary embodiment of neural network.

Referring now to FIG. 12, an exemplary embodiment of neural network 1200 is illustrated. A neural network 1200 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 1204, one or more intermediate layers 1208, and an output layer of nodes 1212. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 13:
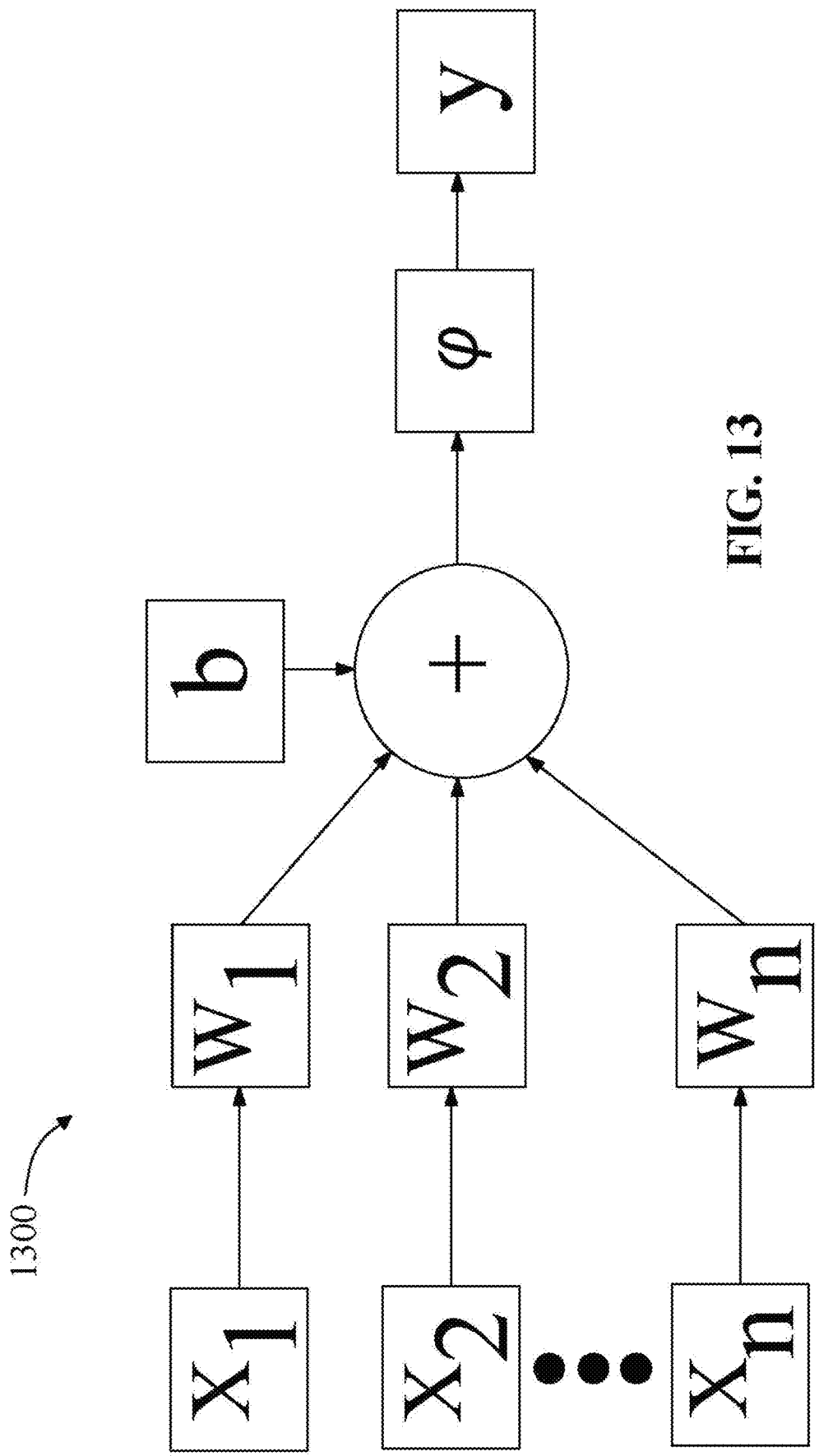
FIG. 13 is a diagram of an exemplary embodiment of a node of a neural network.

Referring now to FIG. 13, an exemplary embodiment of a node 1300 of a neural network is illustrated. A node may include, without limitation a plurality of inputs x; that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 14:
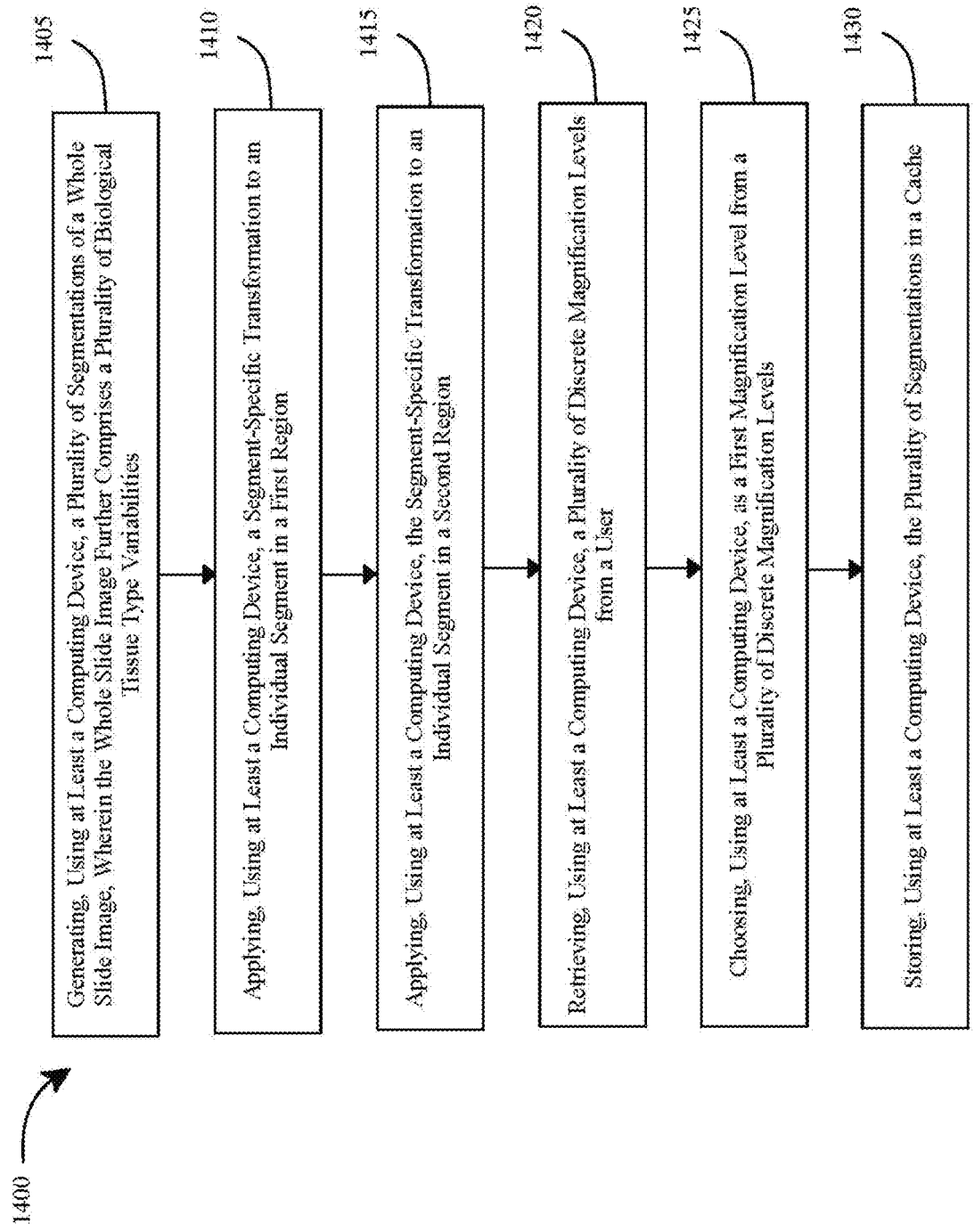
FIG. 14 is a flow diagram illustrating an exemplary workflow of a method for color gamut normalization for pathology slides.

Referring now to FIG. 14, flow diagram of an exemplary workflow of a method 1400 for color gamut normalization for pathology slides is illustrated. Method 1400 includes step 1405 of generating, using at least a computing device, a plurality of segmentations of a whole slide image, wherein the whole slide image further includes a plurality of biological tissue type variabilities. This may be implemented, without limitation, as described above with reference to FIGS. 1-13.

With continued reference to FIG. 14, method 1400 includes step 1405 of applying, using at least a computing device, a segment-specific transformation to an individual segment in a first region. This may be implemented, without limitation, as described above with reference to FIGS. 1-13.

With continued reference to FIG. 14, method 1400 includes step 1415 of applying, using at least a computing device, the segment-specific transformation to an individual segment in a second region 160. This may be implemented, without limitation, as described above with reference to FIGS. 1-13.

With continued reference to FIG. 14, method 1400 includes step 1420 of retrieving, using at least a computing device, a plurality of discrete magnification levels from a user. This may be implemented, without limitation, as described above with reference to FIGS. 1-13.

With continued reference to FIG. 14, method 1400 includes step 1425 of choosing, using at least a computing device, as a first magnification level from a plurality of discrete magnification levels. This may be implemented, without limitation, as described above with reference to FIGS. 1-13.

With continued reference to FIG. 14, method 1400 includes step 1430 of storing, using at least a computing device, the plurality of segmentations in a cache. This may be implemented, without limitation, as described above with reference to FIGS. 1-13.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 15:
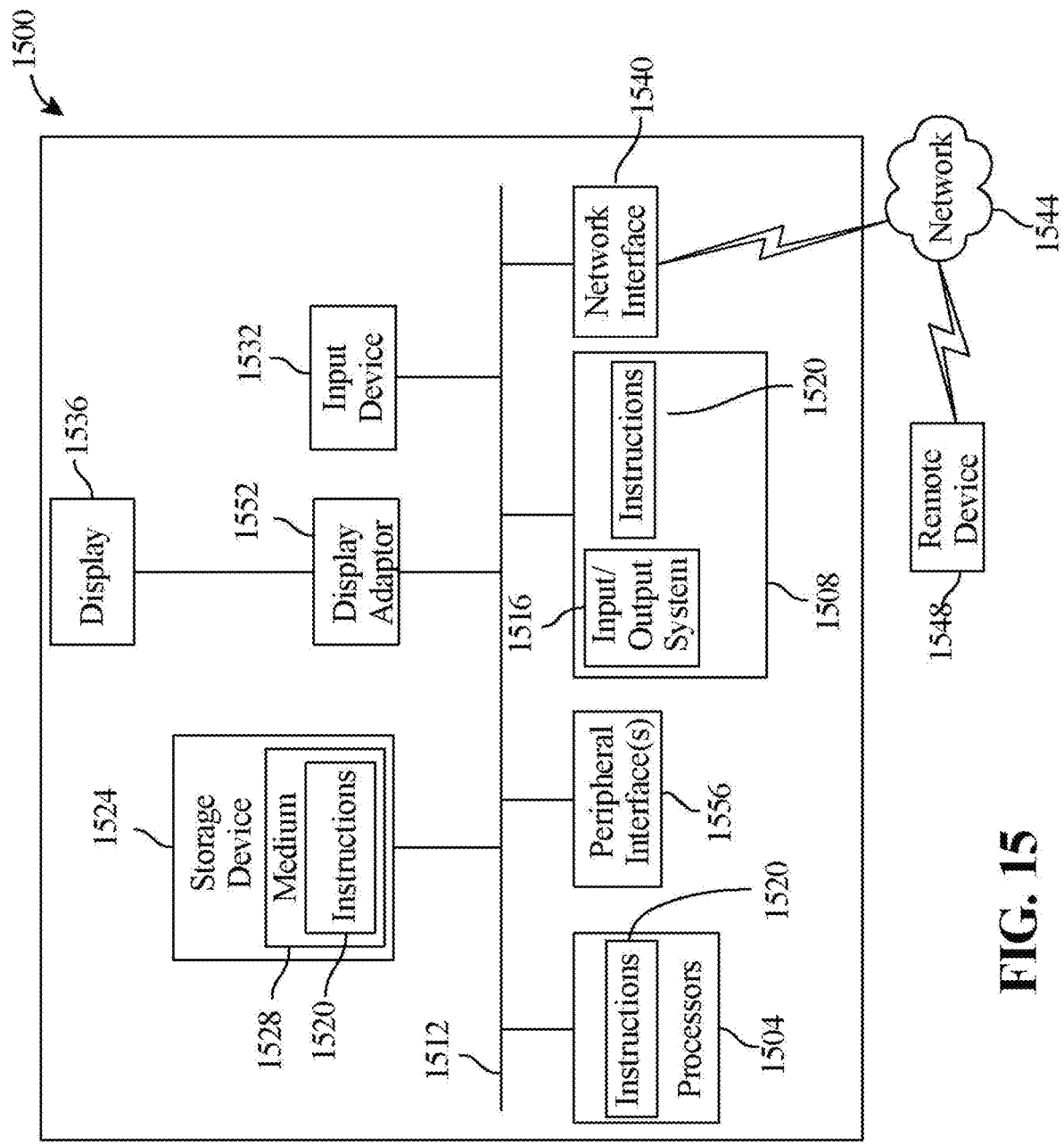
FIG. 15 is a block diagram of a computing system that can be used to implement any one or more of the methodologies disclosed herein and any one or more portions thereof.

FIG. 15 shows a diagrammatic representation of one embodiment of a computing device in the exemplary form of a computer system 1500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1500 includes a processor 1504 and a memory 1508 that communicate with each other, and with other components, via a bus 1512. Bus 1512 may include any of several types of bus structures including, but not limited to, a memory bus, a memory controller, a peripheral bus, a local bus, and any combinations thereof, using any of a variety of bus architectures.

Processor 1504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1504 may be organized according to Von Neumann and/or Harvard architecture as a non-limiting example. Processor 1504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 1508 may include various components (e.g., machine-readable media) including, but not limited to, a random-access memory component, a read only component, and any combinations thereof. In one example, a basic input/output system 1516 (BIOS), including basic routines that help to transfer information between elements within computer system 1500, such as during start-up, may be stored in memory 1508. Memory 1508 may also include (e.g., stored on one or more machine-readable media) instructions (e.g., software) 1520 embodying any one or more of the aspects and/or methodologies of the present disclosure. In another example, memory 1508 may further include any number of program modules including, but not limited to, an operating system, one or more application programs, other program modules, program data, and any combinations thereof.

Computer system 1500 may also include a storage device 1524. Examples of a storage device (e.g., storage device 1524) include, but are not limited to, a hard disk drive, a magnetic disk drive, an optical disc drive in combination with an optical medium, a solid-state memory device, and any combinations thereof. Storage device 1524 may be connected to bus 1512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1524 (or one or more components thereof) may be removably interfaced with computer system 1500 (e.g., via an external port connector (not shown)). Particularly, storage device 1524 and an associated machine-readable medium 1528 may provide nonvolatile and/or volatile storage of machine-readable instructions, data structures, program modules, and/or other data for computer system 1500. In one example, software 1520 may reside, completely or partially, within machine-readable medium 1528. In another example, software 1520 may reside, completely or partially, within processor 1504.

Computer system 1500 may also include an input device 1532. In one example, a user of computer system 1500 may enter commands and/or other information into computer system 1500 via input device 1532. Examples of an input device 1532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1532 may be interfaced to bus 1512 via any of a variety of interfaces (not shown) including, but not limited to, a serial interface, a parallel interface, a game port, a USB interface, a FIREWIRE interface, a direct interface to bus 1512, and any combinations thereof. Input device 1532 may include a touch screen interface that may be a part of or separate from display 1536, discussed further below. Input device 1532 may be utilized as a user selection device for selecting one or more graphical representations in a graphical interface as described above.

A user may also input commands and/or other information to computer system 1500 via storage device 1524 (e.g., a removable disk drive, a flash drive, etc.) and/or network interface device 1540. A network interface device, such as network interface device 1540, may be utilized for connecting computer system 1500 to one or more of a variety of networks, such as network 1544, and one or more remote devices 1548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1544, may employ a wired and/or a wireless mode of communication. In general, any network topology may be used. Information (e.g., data, software 1520, etc.) may be communicated to and/or from computer system 1500 via network interface device 1540.

Computer system 1500 may further include a video display adapter 1552 for communicating a displayable image to a display device, such as display device 1536. Examples of a display device include, but are not limited to, a liquid crystal display (LCD), a cathode ray tube (CRT), a plasma display, a light emitting diode (LED) display, and any combinations thereof. Display adapter 1552 and display device 1536 may be utilized in combination with processor 1504 to provide graphical representations of aspects of the present disclosure. In addition to a display device, computer system 1500 may include one or more other peripheral output devices including, but not limited to, an audio speaker, a printer, and any combinations thereof. Such peripheral output devices may be connected to bus 1512 via a peripheral interface 1556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for color gamut normalization for pathology slides, the system comprising at least a processor and a memory communicatively connected to the at least a processor, wherein the memory contains instructions configuring the at least a processor to:
   receive a magnification level;
   generate a plurality of segmentations of a whole slide image as a function of one or more variabilities and the magnification level, wherein generating further comprises:
      segmenting the whole slide image into a plurality of segments as a function of the one or more variabilities, wherein the one or more variabilities comprises a biological tissue type variability;
   determine a plurality of segment-specific transformations as a function of the plurality of segments; and
   apply the plurality of segment-specific transformations to each segment of the plurality of segments.

2. The system of claim 1, wherein the biological tissue type variabilities comprises tissue thickness.

3. The system of claim 1, wherein the plurality of segment-specific transformations further comprises a transformation selected from a group comprising contrast, brightness, gamma, saturation, and red, green, and blue (RGB) values.

4. The system of claim 1, wherein receiving the magnification level comprises:
receiving a plurality of discrete magnification levels from a user- and choosing the magnification level from the plurality of discrete magnification levels.

5. The system of claim 1, wherein the plurality of segment-specific transformations is applied in real time.

6. The system of claim 1, wherein generating the plurality of segmentations comprises segmenting the whole slide image using a computer vision model.

7. The system of claim 1, wherein the memory contains instructions further configuring the at least a processor to apply the plurality of segment-specific transformations to an individual segment in a first region and a second region of the whole slide image, wherein the second region is different from the first region.

8. The system of claim 7, wherein the memory contains instructions further configuring the at least a processor to:
receive feature data from a user as an input;
apply a first segment-specific transformation of the plurality of segment-specific transformations to the first region of the whole slide image to manifest details of the individual segment in the first region; and
apply a second segment-specific transformation of the plurality of segment-specific transformations to the second region of the whole slide image to manifest details of the individual segment in the second region.

9. The system of claim 1, wherein the memory contains instructions further configuring the at least a processor to:
store a segment bounding path of the plurality of segmentations; and
store the plurality of segment-specific transformations as metadata.

10. The system of claim 1, wherein the memory contains instructions further configuring the at least a processor to store the plurality of segmentations and the corresponding plurality of segment-specific transformations in a cache.

11. A method for color gamut normalization for pathology slides, the method comprising:
receiving, using at least a processor, a magnification level;
generating, using the at least a processor, a plurality of segmentations of a whole slide image as a function of one or more variabilities and the magnification level, wherein generating further comprises:
segmenting the whole slide image into a plurality of segments as a function of the one or more variabilities, wherein the one or more variabilities comprises a biological tissue type variability;
determining, using the at least a processor, a plurality of segment-specific transformations as a function of the plurality of segments;
applying, using the at least a processor, the plurality of segment-specific transformations to each segment of the plurality of segments.

12. The method of claim 11, wherein the biological tissue type variabilities comprises tissue thickness.

13. The method of claim 11, wherein the plurality of segment-specific transformations further comprises a transformation selected from a group comprising contrast, brightness, gamma, saturation, and red, green, and blue (RGB) values.

14. The method of claim 11, further comprising:
receiving, using the at least a processor, a plurality of discrete magnification levels from a users; and
choosing, using the at least a processor, the magnification level from the plurality of discrete magnification levels.

15. The method of claim 11, further comprising:
applying, using the at least a processor, the plurality of segment-specific transformations in real time.

16. The method of claim 11, further comprising:
segmenting, using the at least a processor, the whole slide image, using a computer vision model.

17. The method of claim 11, further comprising:
applying, using the at least a processor, the plurality of segment-specific transformations to an individual segment in a first region and a second region, wherein the second region is different from the first region.

18. The method of claim 17, further comprising:
receiving, using the at least a processor, feature data from a user as an input;
applying, using the at least a processor, a first segment-specific transformation of the plurality of segment-specific transformations to the first region of the whole slide image to manifest details of the individual segment in the first region; and
applying, using the at least a processor, a second segment-specific transformation of the plurality of segment-specific transformations to the second region of the whole slide image to manifest details of the individual segment in the second region.

19. The method of claim 11, further comprising:
storing, using the at least a processor, a segment bounding path of the plurality of segmentations; and
storing, using the at least a processor, the plurality of segment-specific transformations as metadata.

20. The method of claim 11, further comprising:
storing, using the at least a processor, the plurality of segmentations and the corresponding plurality of segment-specific transformations in a cache.

* * * * *